United States Patent
Afkhami et al.

(10) Patent No.: US 9,608,696 B2
(45) Date of Patent: Mar. 28, 2017

(54) DYNAMIC TRANSMIT POWER AND SIGNAL SHAPING

(71) Applicant: QUALCOMM Incorporated, San Diego, CA (US)

(72) Inventors: Hassan Kaywan Afkhami, Ocala, FL (US); Deniz Rende, Gainesville, FL (US); Purva Rameshchandra Rajkotia, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 14/052,130

(22) Filed: Oct. 11, 2013

(65) Prior Publication Data
US 2015/0103751 A1    Apr. 16, 2015

(51) Int. Cl.
*H04L 27/26* (2006.01)
*H04B 3/54* (2006.01)
*H04L 25/03* (2006.01)
*H04L 5/00* (2006.01)

(52) U.S. Cl.
CPC ......... *H04B 3/54* (2013.01); *H04L 25/03834* (2013.01); *H04L 27/2646* (2013.01); *H04B 2203/5425* (2013.01); *H04L 5/0046* (2013.01)

(58) Field of Classification Search
CPC ........................................ H04W 52/00–52/60
See application file for complete search history.

(56) References Cited

U.S. PATENT DOCUMENTS

| 7,693,032 | B2 | 4/2010 | Li et al. |
| 8,031,667 | B2 | 10/2011 | Kang et al. |
| 8,238,861 | B2 | 8/2012 | Li et al. |
| 8,345,793 | B2 | 1/2013 | Dent |

(Continued)

FOREIGN PATENT DOCUMENTS

| CN | 101015134 | 8/2007 |
| CN | 101669291 | 3/2010 |

(Continued)

OTHER PUBLICATIONS

Co-pending U.S. Appl. No. 14/052,152, filed Oct. 11, 2013, 56 pages.
Chiang, Johann et al., "Use of Cognitive Radio Techniques for OFDM Ultrawideband Coexistence With WIMAX", { johann. chiang, jim.lansford }@alereon.com, Texas Wireless Symposium, 2005, 5 pages.

(Continued)

*Primary Examiner* — Hoon J Chung
*Assistant Examiner* — Zhensheng Zhang
(74) *Attorney, Agent, or Firm* — DeLizio Law, PLLC

(57) ABSTRACT

This disclosure provides several mechanisms for adapting transmit power spectral density (PSD). A communications device may adapt the power spectrum utilized at the transmitter based, at least in part, on the channel conditions or PSD constraints associated with the communications medium between the transmitter and a receiver device. Additionally, the transmit PSD may be adapted based, at least in part, on a total power capability associated with a transmitter. Power is allocated to improve throughput and utilization of the communications channel. A transmission profile may be selected based, at least in part, on the notch depth. The transmission profile may be associated with symbol timing parameters. The communications device may maintain a plurality of selectable pulse shapes that are optimized for different notch depths.

28 Claims, 14 Drawing Sheets

(56) References Cited

U.S. PATENT DOCUMENTS

| | | | |
|---|---|---|---|
| 8,406,317 B2 | 3/2013 | Tlich et al. | |
| 8,923,910 B2 | 12/2014 | Wu et al. | |
| 9,295,010 B2 | 3/2016 | Karimi et al. | |
| 2002/0071173 A1* | 6/2002 | Lee | H01S 3/06758 359/337.1 |
| 2005/0281238 A1 | 12/2005 | Blasco Clarest et al. | |
| 2007/0025391 A1* | 2/2007 | Yonge et al. | 370/458 |
| 2008/0212527 A1 | 9/2008 | Hosein et al. | |
| 2008/0279142 A1* | 11/2008 | Kim et al. | 370/329 |
| 2009/0190673 A1* | 7/2009 | Koga | H04B 3/542 375/257 |
| 2010/0304681 A1 | 12/2010 | Ghassemzadeh et al. | |
| 2010/0316140 A1 | 12/2010 | Razazian et al. | |
| 2011/0019779 A1* | 1/2011 | Miyata | 375/340 |
| 2011/0164514 A1 | 7/2011 | Afkhamie et al. | |
| 2011/0164670 A1* | 7/2011 | Abad Molina et al. | 375/227 |
| 2011/0199983 A1* | 8/2011 | Hasan Mahmoud | H04W 52/267 370/329 |
| 2011/0287802 A1* | 11/2011 | Ma | H04L 5/0066 455/517 |
| 2012/0276943 A1* | 11/2012 | Adachi | 455/522 |
| 2014/0266641 A1 | 9/2014 | Langlais et al. | |
| 2015/0103809 A1 | 4/2015 | Karimi et al. | |

FOREIGN PATENT DOCUMENTS

| | | |
|---|---|---|
| JP | 2009002696 | 7/2010 |
| KR | 20100072187 | 6/2010 |
| WO | 2006135081 | 12/2006 |
| WO | 2010085818 | 7/2010 |
| WO | 2011106699 | 9/2011 |
| WO | 2014153074 | 9/2014 |
| WO | 2014164718 | 10/2014 |
| WO | 2015054171 | 4/2015 |
| WO | 2015054172 | 4/2015 |

OTHER PUBLICATIONS

Lansford, Jim , "UWB Co-Existence and Cognitive Radio: How Multiband-OFDM Leads the Way", www.agilent.com/ find / eesof jim.lansford@alereon.com, 7 Pages.

European Telecommunications Standards Institute (ETSI), 650, Route Des Lucioles; F-06921 Sophia-Antipolis; France, vol. PLT, No. Vm.t.e, Jan. 24, 2007 (Jan. 24, 2007), Jan. 19, 2015, 38 Pages.

"PCT Application No. PCT/US2014/059382 International Search Report", Jan. 27, 2015, 17 pages.

"PCT Application No. PCT/US2014059384 International Search Report", Jan. 19, 2015, 13 pages.

"U.S. Appl. No. 14/052,152 Office Action", Mar. 27, 2015, 16 pages.

Danny, et al., "ADSL: O.adslplus: Proposed Appendix on PSD template to be used in Capacity Calculations with In-band Transmit Spectrum Shaping", ITU-T Draft; Study Period 2001-2004, International Telecommunication Union, Geneva; CH, vol. 4/15, 10 pages.

Salvatore, et al., "Adaptive pulse-shaped OFDM with application to in-home power line communications", Telecommun Syst (2012) 51:3-13 DOI 10.1007/s11235-010-9410-3, Jan. 20, 2011, pp. 3-13.

"U.S. Appl. No. 14/052,152 Final Office Action", Jul. 31, 2015, 19 pages.

"PCT Application No. PCT/US2014/059382 Written Opinion", Oct. 7, 2015, 9 pages.

"PCT Application PCT/US2014/059384 Written Opinion", Sep. 23, 2015, 8 pages.

"PCT Application No. PCT/US2014/059382 International Preliminary Report on Patentability", Jan. 25, 2016, 17 pages.

"Japanese Patent Application No. 2016-521745, Office Action", Oct. 25, 2016, 4 pages.

"PCT Application No. PCT/US2014/059384 International Preliminary Report on Patentability", Nov. 17, 2016, 11 pages.

\* cited by examiner

DYNAMIC TRANSMIT POWER AND SIGNAL SHAPING

BACKGROUND

Embodiments of this disclosure generally relate to the field of network communications, and, more particularly, to characteristics of transmitted signals.

Communications technology is evolving to utilize multi-frequency transmissions over a communications medium. For example, in many technologies, such as powerline communications, a transmitting device may send signals via a plurality of frequencies to one or more other devices coupled to the communications medium. Other medium and technologies may also use multi-carrier transmissions in which multiple frequencies are used over a communications channel.

Power spectral density (PSD) refers to power distribution for signals over different frequencies. For example, power may be reduced for a subset of the frequencies used over the communications channel. Reducing power for particular frequencies may also be referred to as "notching" or "filtering." In some communications medium, certain frequencies are required to be notched (e.g., as a result of regulatory or standardization requirements), and may be referred to as notched, reserved, or rejection bands. PSD constraints (also referred to PSD limit, PSD requirements, or PSD mask) for various frequencies may introduce notches having different notch depths. A notch depth refers to the difference between an un-notched signal power level (for frequencies outside of the notch), and the notched signal power level for frequencies in the notch. In the PSD of a transmitted signal, notch depths may be dependent on PSD requirements, channel quality, or optimization techniques.

SUMMARY

Various embodiments are described to adapt transmit power and/or pulse shaping in relation to PSD constraints. PSD constraints may include regulated PSD limitations, channel quality limitations, or other constraints. Transmit power allocation may be made based, at least in part, on the PSD constraints, channel quality, and/or transmitter power limitations. A PSD of a signal may be based, at least in part, on the power allocation. A notch depth associated with the PSD may be determined. In some embodiments, a notch depth may be altered by adjusting the PSD (e.g., by adjusting the power allocation for some frequencies). For example, a PSD may be adjusted in view of the notch depths associated with the PSD. A pulse shape may be selected based, at least in part, on the notch depths. Changes to the transmitter power or the pulse shape may be communicated to a receiving device.

In one embodiment, power allocation is based, at least in part, on a total power capability of a transmitter. A frequency band associated with a communications channel may be defined to include a plurality of frequency sub-bands. Portions of a total power capability associated with a transmitter may be allocated to each of the plurality of frequency sub-bands. A power level for each frequency sub-band may be determined based, at least in part, on the allocated portion of the total power capability allocated to the frequency sub-band. Power levels may be adapted based, at least in part, on channel quality to optimize the use of total power capability associated with the transmitter. A PSD of a signal may be based, at least in part, on the adapted power levels in the power allocation map. A pulse shape may be selected based, at least in part, on notch depth associated with the PSD.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
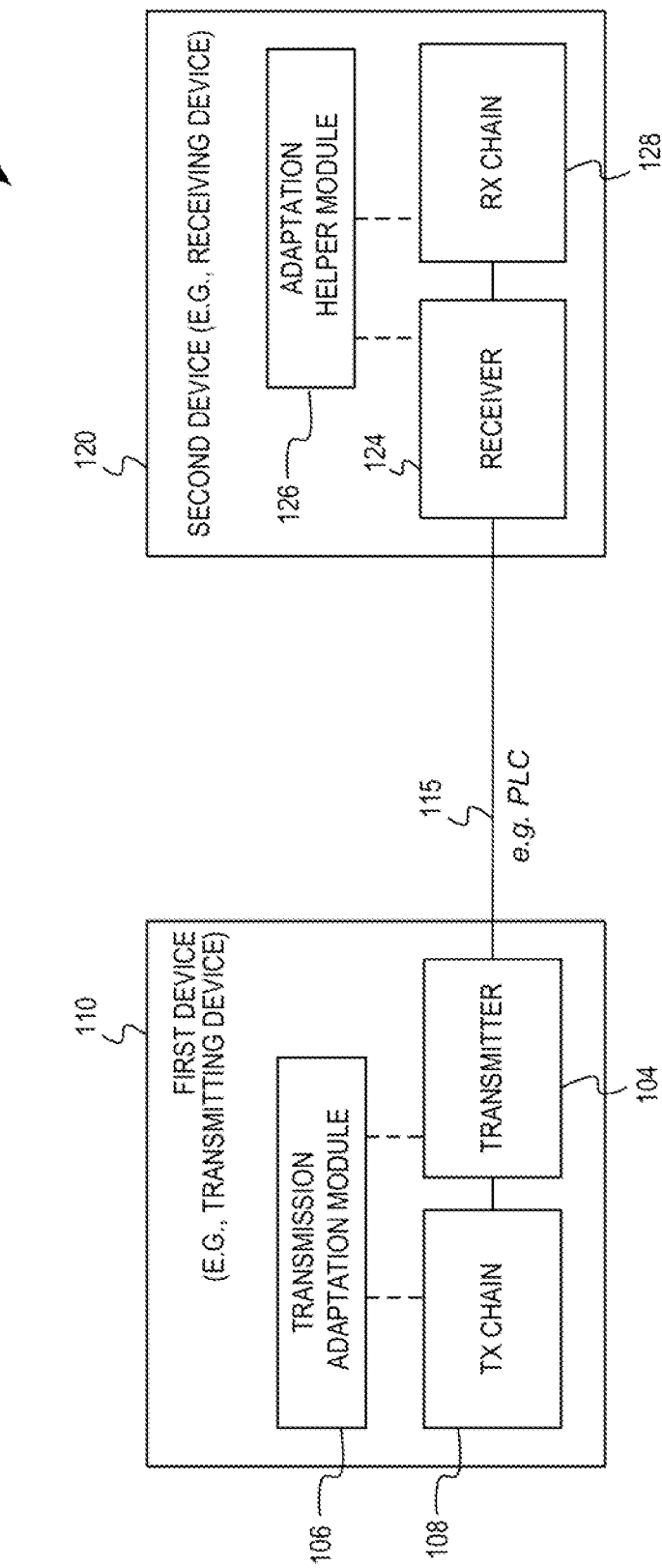
FIG. 1 is a diagram illustrating an example system in which dynamic transmit power allocation and transmission profiles may be used in accordance with various example embodiments of this disclosure.

The description that follows includes exemplary systems, methods, techniques, instruction sequences and computer program products that embody techniques of the present disclosure. However, it is understood that the described embodiments may be practiced without these specific details. For instance, although some examples may refer to transmit power adaptation and/or pulse shaping for powerline communications, the various adjustment techniques taught by this disclosure may be applicable to other communications technologies, including wireless communications. In other instances, well-known instruction instances, protocols, structures and techniques have not been shown in detail in order not to obfuscate the description.

A transmitted signal may be associated with a power spectral density (PSD) that indicates power associated with different frequencies. In an orthogonal frequency division multiplexing (OFDM) technology, several carriers are used to communicate an OFDM symbol. Each carrier may have different power levels based, at least in part, on channel conditions or PSD constraints. For example, many communications systems operate in environments where regulations limit the transmit power that can be used at any given frequency. For example, a new regulation (referred to as EN50561-1) has recently been passed to regulate power for power line communications devices operating in Europe. This regulation allows increased transmit power on some carriers, but further limits the frequency ranges on which a power line communications device can transmit.

Other factors may impact the PSD constraint. For example, channel conditions of the communications media may cause a PSD constraint. For example, a communications system may utilize a protocol or algorithm to determine a PSD constraint based, at least in part, on channel quality estimates. System-imposed or device-imposed constraints may also be used in a PSD constraint to limit power for some carriers in a signal.

A communications system is often designed to take advantage of any allowed transmit power within the limits of the PSD constraint. The transmit power level remains limited in frequency ranges that are reserved or otherwise regulated. A notch in a PSD of a signal refers to a frequency or set of frequencies at which power is reduced in accordance with a PSD constraint. A notch depth refers to the difference between an un-notched signal power level (for frequencies outside of the notch), and the notched signal power level for frequencies in the notch. Depending on the transmit power level, the notch depth may change. Therefore, notch depths in a PSD of a signal may be dependent on PSD constraints, channel quality, or other factors. A relationship between transmit power for various frequencies (e.g., defined by a PSD of a signal) and a notch depth may be used to optimize a transmission. Furthermore, pulse shaping may be used to achieve various PSDs or notch depths.

This disclosure provides several mechanisms for adapting transmit power and/or selecting a transmission profile to accommodate different characteristics of the communications system. For example, a transmitter may adapt transmit power based, at least in part, on notch depth, transmitter power capabilities, channel characteristics observed regarding particular carriers of the communications channel, and/or a PSD roll-off associated with a selected pulse shape. In some embodiments, various combinations of these mechanisms may be implemented together.

FIG. 1 illustrates a system 100 in which a first device 110 is communicatively coupled to a second device 120 via a communications medium 115. In one example, the communications medium 115 may utilize powerline communications (PLC) over a powerline medium. In other alternatives, the communications medium 115 may be a variety of wire line or wireless mediums capable of carrying multi-carrier transmissions to a receiving device.

The first device 110 may be referred to as a transmitting device and the second device 120 may be referred to as a receiving device. It should be understood that both the first device 110 and second device 120 may be capable of both transmitting and receiving signals via the communications medium 115. However, in the example of this Figure, the first device 110 is referred to as a transmitting device to focus on the transmitter features. The first device 110 may include a communications unit (not shown) which regulates communications via the communications medium 115. The first device may include a transmit (TX) chain 108 and a transmitter 104, each of which may be included in the communications unit of the first device 110. The TX chain 108 and transmitter 104 are further described in FIG. 2. The transmitter 104 may be coupled to the communications medium 115 via a physical interface (not shown) such as an antenna, electrical interface, etc.

First device 110 may also include a transmission adaptation module 106 configured to implement various features of this disclosure. For example, the transmission adaptation module 106 may modify power settings, filters, pulse shaping, and/or symbol timing configurations of the TX chain 108 or transmitter 104. In some implementations, the transmission adaptation module 106 may cause a message or part of a message to be sent to the second device 120 to inform the second device 120 regarding transmission adaptation settings. For example, the transmission adaptation module 106 may inform the second device 120 regarding power allocations, symbol timing, or other transmission profile information. The first and second devices 110, 120 may communicate with each other using any of a variety of communications protocols.

In FIG. 1, the second device 120 includes a receiver 124 for coupling the second device 120 to the communications medium 115. The second device 120 also includes a receive (RX) chain 128 and an adaptation helper module 126. The RX chain 128 and receiver 124 are further described in FIG. 2. The adaptation helper module 126 may be configured to implement various features of this disclosure.

Having described the features of FIG. 1, several concepts related to the transmission from the first device 110 to the second device 120 are now described. In accordance with an embodiment of this disclosure, a communications device may adapt the transmit power spectral density (PSD) utilized at the transmitter based, at least in part, on the channel conditions of the communications medium 115 between the transmitter 104 and a receiver 124. For example, the transmit power may be adapted based, at least in part, on channel state information, such as signal-to-noise ratio (SNR) or attenuation. In one example, channel conditions (e.g., SNR values) may be detected and used to identify groupings of frequency sub-bands. The communications device may further adapt the transmit PSD based on a dynamic power range of a transmitter analog front end (AFE). AFE power capabilities may impact the signal quality at different PSD levels. For example, as power is backed off, the separation between high power and low power carriers may be reduced, causing a higher SNR for the low power carriers.

Typically, the second device 120 will receive signals from the first device 110 and determine channel conditions associated with various carriers associated with the communications medium 115. Channel quality is estimated at regular intervals for each carrier. Indicators that may be used as a measurement of the quality of a transmission via a signal (e.g., via a frequency) include the signal-to-noise ratio (SNR) or signal-to-interference-plus-noise (SINR). The formula for SINR may be defined as $P/(I+N)$ where P represents the received power, I represents the interference power of other simultaneous transmissions, and N represents the noise (such as background or intermittent noise). Often, "noise" will be defined to include interference as well as background noise or intermittent noise. Therefore, when measuring signal to noise ratio, the measurement may be referred to as SNR or SINR interchangeably in some systems. SNR is used as a measurement of the quality of a transmission via a signal because it correlates with a receiver's ability to interpret the transmitted signal. Another measurement that may define channel conditions is channel attenuation. In some embodiments, the transmit PSD may be adjusted in view of the channel attenuation.

The second device 120 may analyze the channel conditions and prepare a tone map (or multiple tone maps) and send the tone map to the first device 110. The first device 110 may be configured to utilize the tone map in subsequent transmissions to the second device 120. The physical layer transmission properties (e.g., included in a tone map) indicate which carriers are used to transmit data, as well as the type of modulation and error correction coding to be used for each carrier. As such, a tone map may be based, at least in part, on channel quality and throughput capability for particular frequencies. For example, the channel quality estimation process may be used to determine the maximum transmission rate possible for each frequency associated with the communications medium 115. Alternatively, in some communications systems, a same modulation and error correction coding may be used for all carriers. The tone map, or channel quality feedback regarding the channel conditions, may be good indicators to the first device 110 regarding which carriers are better quality than other carriers.

The first device 110 may be configured to utilize the tone map (or other physical layer transmission properties) to set the modulation and coding scheme (MCS) associated with each carrier in a multi-carrier transmission. In addition to the MCS, the first device 110 may also manage a power level associated with each carrier in accordance with an amplitude map. The amplitude map defines the relative amount of power used for each carrier or groups of carriers. For example, in one implementation, the amplitude map may include a single value for each carrier to indicate a relative power level for the carrier (e.g., "−30" for carriers that have a reduced power level −30 dB from a maximum power level or baseline power level). The power spectral density PSD of a transmit signal may be used to describe the power levels for particular frequencies. Empirically, a PSD of a particular signal may be measured, such as with a spectrum analyzer, or may be determined (e.g., calculated), for example, based, at least in part, on information about the amplitude map (power level), pulse shape, symbol timing, guard interval, and/or other characteristics of the transmit signal.

Referring now to the transmission adaptation module 106, a target PSD of a signal may be dynamically created based, at least in part, on a variety of PSD constraints (including the channel conditions, amplitude map, tone map, and/or regulatory PSD limitations). The transmission adaptation module 106 may include memory, logic, or other mechanisms to determine various PSD constraints that should be used to determine the target PSD that satisfies the PSD constraints. As described in this disclosure, the PSD constraints may include constraints based, at least in part, on regulatory requirements, quality of the communications medium 115, and/or PSD roll-off associated with a variety of transmission profiles. A transmission profile will be described further in FIG. 9 and FIGS. 10A-10B.

In one embodiment, the transmission adaptation module 106 may also take into account total power capabilities associated with the transmitter 104. In some communications systems, a transmitter 104 may be included as part of an integrated analog front end (AFE) of a communications device. However, depending on characteristics of the AFE, such as a power amplifier limitation, transmitter capability, dynamic range, and component limitations, the AFE may not be able to achieve a full transmit power level on many of the carrier frequencies in the communications medium. For example, the AFE may be limited to 1 Watt of power. In some communications channels, it may be less efficient to transmit at the highest power allowed for a carrier because it would consume a greater amount of the limited total power output, leaving less power available to be allocated to other carriers. In some implementations, the analog front end of a communications device may utilize a lower power level for groups of frequencies so that a greater quantity of carriers may be used in a transmission. The transmission adaptation module 106 may utilize the total power capability of the AFE to adapt a target PSD for the transmission. An example of adapting the PSD based, at least in part, on the total power capability of the AFE is further described in FIGS. 4A-4B. Distribution (or allocation) of power among multiple carriers may provide better overall throughput and utilization of the communications channel.

It should be understood that power allocation may also take into account quantization error and dynamic range of the AFE. For example, a larger range of power levels may cause a higher quantization error, while reducing the range of power levels may reduce quantization error. Techniques for allocating power may consider the dynamic range of the AFE as well as a threshold difference between power levels for different frequencies in a symbol transmission.

In one embodiment, the transmission adaptation module 106 may allocate power from a total power capability of the AFE to the PSD. For example, the transmission adaptation module 106 may be suitable for defining frequency sub-bands associated with the communications medium 115. The frequency sub-bands may include one or more frequency sub-bands associated with notched frequencies (e.g., due to PSD constraints). One or more frequency sub-bands may be defined to isolate poor quality carriers (i.e., channel quality below a threshold) so that power for the poor quality carriers may be controlled separately from power allocations to other frequency sub-bands. In one embodiment, the transmission adaptation module 106 may utilize the tone map or channel quality indicators (e.g., SNR measurements) provided by the second device 120 to define the frequency sub-bands. The transmission adaptation module 106 may use the defined frequency sub-bands to allocate portions of the total power capability associated with the transmitter 104 to the frequency sub-bands.

In accordance with this disclosure, a power allocation map may be communicated by the transmission adaptation module 106 via the transmitter 104 to the adaptation helper module 126 via the receiver 124. The power allocation map may be referred to as a transmitter amplitude map or a power spectrum distribution map. The power allocation map may include information about the power levels associated with various carriers allocated by the transmission adaptation module 106 for the transmission. In one embodiment, the first device 110 includes the power allocation map in a first portion (e.g., header or preamble) of a transmission to the second device 120.

Another factor that the transmission adaptation module 106 may utilize to define the target PSD is notch depth for particular frequency sub-bands. The transmission adaptation module 106 may adjust power for particular frequencies to control the notch depth within a threshold range optimized for a transmission profile. The transmission profile is used to shape the power used at various frequencies used in a symbol transmission. Each transmission profile may be associated with different PSD roll-off characteristics. In accordance with this disclosure, the first device 110 may be capable of selecting different transmission profiles based, at least in part, on a notch depth for a particular target PSD. While, typically the target PSD may be determined first, the transmission adaptation module 106 may adjust power levels to control notch depth within a range optimal for one of the transmission profiles.

A pulse shape refers to a pulse shaping process of changing the waveform of transmitted pulses. In one embodiment, pulse shaping refers to time domain shaping during symbol overlap and transition to manage spectral leakage and shaping in the frequency domain. Changing the length of the adjacent symbols overlap area and the transition interval shaping results in different frequency domain notch depth levels. In another embodiment, pulse shaping refers to the modification of power for each sinusoidal carrier. In accordance with this disclosure, pulse shaping may be used to optimize the pulse tapering or PSD roll-off for a particular notch depth.

A transmission profile may include pulse shaping settings and/or symbol timing information. Transmission profiles are further described in FIG. 9 and FIGS. 10A-10B. In accordance with this disclosure, a transmission profile may be selected based, at least in part, on the notch depth. For example, a notch depth may be determined by the transmission adaptation module 106 based, at least in part, on the target PSD. The notch depth may be used to select a pulse shape that produces a PSD roll-off characteristic that is appropriate for the notch depth. Typically a transmission profile may be used for a commonly occurring notch depth (e.g., 30 db power change from one power level to the notched power level). However, in accordance with this disclosure, a plurality of transmission profiles may be used—each transmission profile may be optimized for different notch depths. The first device 110 may maintain a plurality of selectable transmission profiles that are optimized for different notch depths. Each transmission profile may also have an associated guard interval length for managing the delay between symbol transmissions. In an embodiment, each selectable transmission profile may also be associated with a change to the OFDM symbol timing (such as transition interval, roll-off interval, guard interval, or other characteristics).

The transmission adaptation module 106 may determine the notch depth associated with particular frequency subbands and select an appropriate transmission profile based, at least in part, on the notch depth. For example, a first transmission profile may be used when the notch depth is 30 db and a second transmission profile may be used when the notch depth is 40 db. A transmitted signal may be optimized by the transmission adaptation module 106 to include more power in the adjacent frequencies outside a notch due to better PSD roll-off associated with a particular transmission profile.

In accordance with this disclosure, information about the transmission profile may be communicated from the first device 110 to the second device 120. The second device 120 may utilize the transmission profile information to receive transmissions from the first device 110. The information about the transmission profile and the power allocation map may be communicated in a same message or in separate messages. The information about the transmission profile and/or the power allocation map may be included in a first part of a transmission (such as a preamble or header) to indicate the transmission profile and/or power allocation map that will be used in a second part of the transmission.

Figure 2:
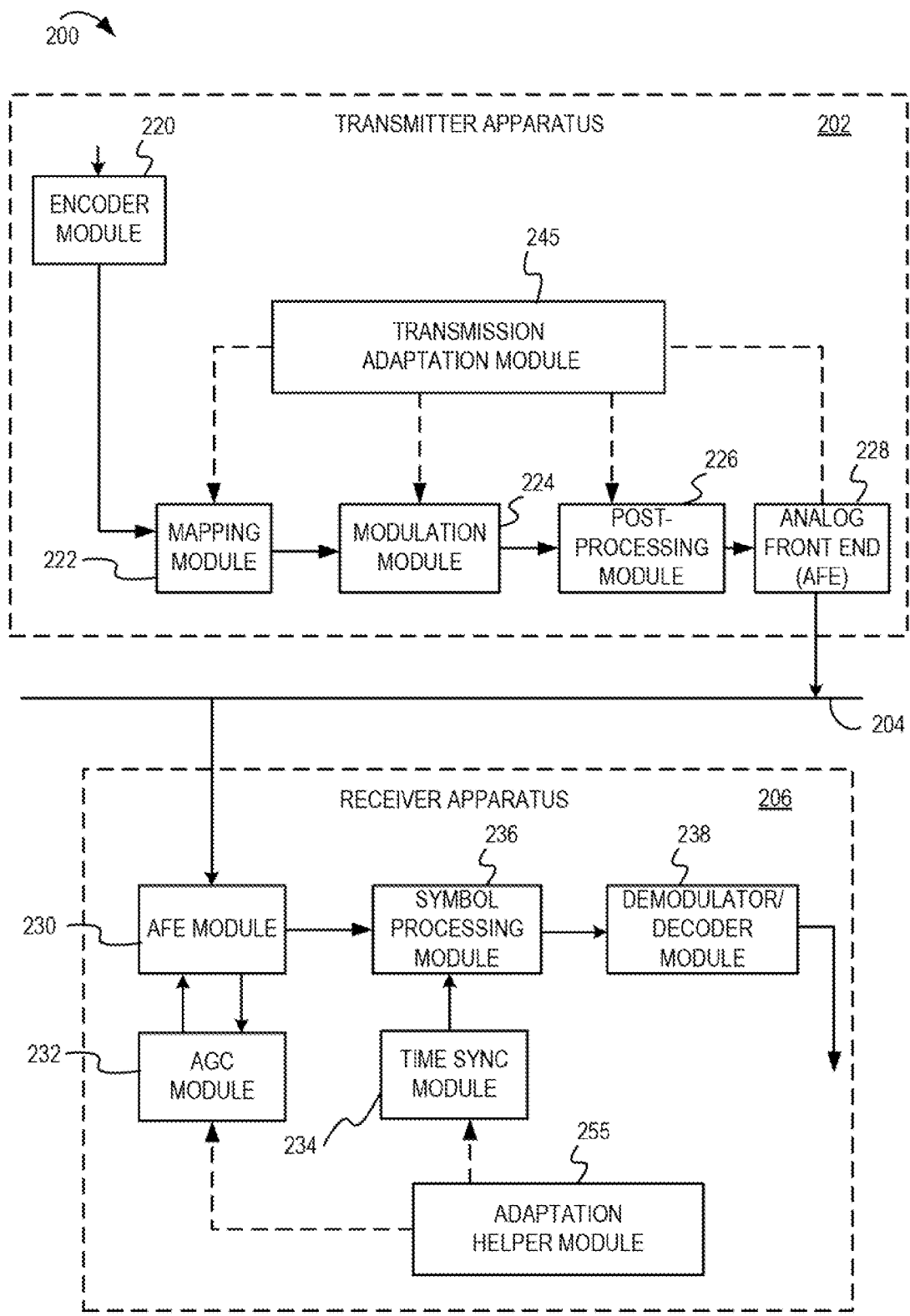
FIG. 2 is a block diagram of a communications system for communicating over the network.

FIG. 2 is a block diagram of a communications system 200 that includes a transmitter apparatus 202 for transmitting a signal (e.g., a sequence of OFDM symbols) over a communications medium 204 to a receiver apparatus 206. The transmitter apparatus 202 and receiver apparatus 206 can both be incorporated into a network interface module at each device (e.g., first and second devices 110, 120). The communications medium 204 can represent a communications channel from one device to another over a wired or wireless network.

At the transmitter apparatus 202, modules implementing the physical (PHY) layer may receive a media access control (MAC) layer protocol data unit (MPDU) from the MAC layer. The MPDU is sent to an encoder module 220 to be processed, which may include scrambling, error correction coding and interleaving. The encoded data is fed into a mapping module 222 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. Alternatively, any appropriate mapping scheme that associates data values to modulated carrier waveforms can be used. The mapping module 222 may also determine the type of modulation to be used on each of the carriers (or "tones") according to a tone map. The tone map can be a default tone map, or a customized tone map determined by the receiver apparatus 206.

The mapping module 222 may also be configured to determine which of the carrier frequencies $f_1, \ldots, f_N$ within the communications channel are used by the communications system 200 to transmit information. The power level with which signals are transmitted on the communications medium 204 may be associated with power level adjustments (e.g., gain or reduction) that may also be included in the tone map or an amplitude map. In accordance with this disclosure, a transmission adaptation module 245 (similar to transmission adaptation module 106) may adjust power levels for various groups of frequencies based, at least in part, on techniques disclosed herein. The transmission adaptation module 245 may utilize information from an analog front end (AFE) module 228, the tone map, PSD constraints, SNR feedback, or other factors to determine the target PSD of the signal. The transmission adaptation module 245 may utilize the target PSD to adjust the power levels of carriers at that mapping module 222.

A modulation module 224 performs the modulation of the resulting set of N complex numbers (some of which may be zero for unused carriers) determined by the mapping module 222 onto N orthogonal carrier waveforms having peak frequencies $f_1, \ldots, f_N$. The modulation module 224 performs an inverse discrete Fourier transform (IDFT) to form a discrete time symbol waveform. In one example, the data from the mapping module 222 is modulated onto subcarrier waveforms using an 8192-point inverse fast Fourier transform (IFFT), resulting in 8192 time samples which make up part of an OFDM symbol. The resulting time samples are in the time domain, while the input to the IDFT is in the frequency domain.

In some embodiments, the transmission adaptation module 245 may select a transmission profile that has associated symbol timing information (such as guard interval, transition interval, or other symbol timing features). The transmission adaptation module 245 may configure the modulation module 224 based, at least in part, on the symbol timing information associated with the selected transmission profile. The transmission profile may also have pulse shaping information. It should be understood that symbol timing and pulse shaping may be coordinated to optimize the transmission profile.

A post-processing module 226 may combine a sequence of consecutive (potentially overlapping) symbols into a "symbol set" that can be transmitted as a continuous block over the communications medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communications medium 204) the post-processing module 226 may extend each symbol with a cyclic prefix that is a copy of the last part of the symbol. For example, a portion of the time samples from the end of the 8192 time samples may be copied as a cyclic prefix at the beginning of the OFDM symbol. The post-processing module 226 can also perform pulse shaping (e.g., using a pulse shaping filter in the time domain) to a symbol.

The transmission adaptation module 245 may be used to manage a plurality of transmission profiles. A selected transmission profile may be selected based at least in part on notch depth associated with two adjacent groups of frequencies. The transmission profile may be associated with pulse shaping and/or symbol timing. The transmission adaptation module 245 may apply pulse shaping filtering either before or after the IDFT calculation (e.g., in the frequency domain, or in the time domain).

In one embodiment, the pulse shaping may be performed at the post-processing module 226. The pulse shaping may be applied in the time domain or the frequency domain. For example, the pulse shaping may include multiplying each time sample at the output of the modulation module 224 with a value from a pulse-shaping window to generate a pulse-shaped OFDM time samples for transmission. In one embodiment, pulse shaping involves tapering the front and back of a time domain OFDM symbol, by multiplying the entire symbol with a pulse-shaping window of the same length: the front taper has values ramping from 0 to 1, most of the time domain samples are left unchanged (multiplied by 1), the end of the OFDM symbol is multiplied by values ramping down from 1 to 0. FIG. 10 shows the tapering at the end of each OFDM symbol. Typically the parts that are tapered can be overlapped with the adjacent symbols after tapering. In other implementations, pulse shaping may be achieved by applying a filter to the time domain samples at the output of the modulation module 224.

By filtering the time samples for a symbol in different ways, the intersymbol interference can be adjusted or controlled. For example, as a modulation rate increases the bandwidth of the signal may increase. When the symbol bandwidth becomes larger than the channel bandwidth, the channel may introduce distortion to the signal. This distortion is usually detected as intersymbol interference. A transmission profile may adjust the pulse shape as well as the guard interval length between symbols (also referred to as intersymbol guard interval).

An Analog Front End (AFE) module 228 couples an analog signal containing a continuous-time (e.g., low-pass filtered) version of the symbol set to the communications medium 204. In some embodiments, the AFE module 228 may be referred to as an integrated front-end amplifier. The AFE module 228 may have a total power capability limit that it can output. The transmission adaptation module 245 may determine a total power capability associated with the AFE module 228 and use the total power capability as a factor in power allocation as described in this disclosure. Together, the encoder module 220, mapping module 222, modulation module 224, post processing module 226 and AFE module 228 may be referred to as a TX chain and transmitter.

At the receiver apparatus 206, modules implementing the PHY layer may receive a signal from the communications medium 204 and generate an MPDU for the MAC layer (not shown). An AFE module 230 may operate in conjunction with an Automatic Gain Control (AGC) module 232 to send a received signal to a symbol processing module 236. The symbol processing module 236 may use a time synchronization module 234 to generate sampled signal data. The symbol processing module 236 may also include a discrete Fourier transform (DFT) feature to translate the sampled received waveform into frequency domain data in the form of complex numbers. It should be understood that the receiver apparatus 206 also may be aware of the tone map used for generating and transmitting the signal. Therefore, the AGC module 232 may also be configured to take into account power level adjustments that were included as part of the tone map. In some embodiments, the AGC module 232 may also be configured to adjust gain based, at least in part, on a power allocation map provided by the transmission adaptation module 245 of the transmitter apparatus 202. The time synchronization module 234 and/or symbol processing module 236 may also utilize information provided by the transmission adaptation module 245 of the transmitter apparatus 202 to improve detection of the transmitted information. For example, the transmission profile may be associated with a guard interval length that is used by the time synchronization module 234 to aid in the detection of the symbols. An adaptation helper module 255 may be configured to receive messages from the transmission adaptation module 245 of the transmitter apparatus 202. The adaptation module 255 may configure components of the receiver apparatus components based, at least in part, on the power and/or transmission profile information received from the transmission adaptation module 245 of the transmitter apparatus 202.

The demodulator/decoder module 238 maps the complex numbers onto the corresponding bit sequences and performs the appropriate decoding of the bits (including de-interleaving and descrambling). Together, the AFE module 230, AGC module 232, time synchronization module 234, symbol processing module 236 and demodulator/decoder module 238 may be referred to as a receiver and RX chain. It should be understood that the RX chain may include other components (not shown), such as an equalizer, filters, etc.

Any of the modules of the communications system 200 including modules in the transmitter apparatus 202 or receiver apparatus 206 can be implemented in hardware, software, or a combination of hardware and software.

Figure 3:
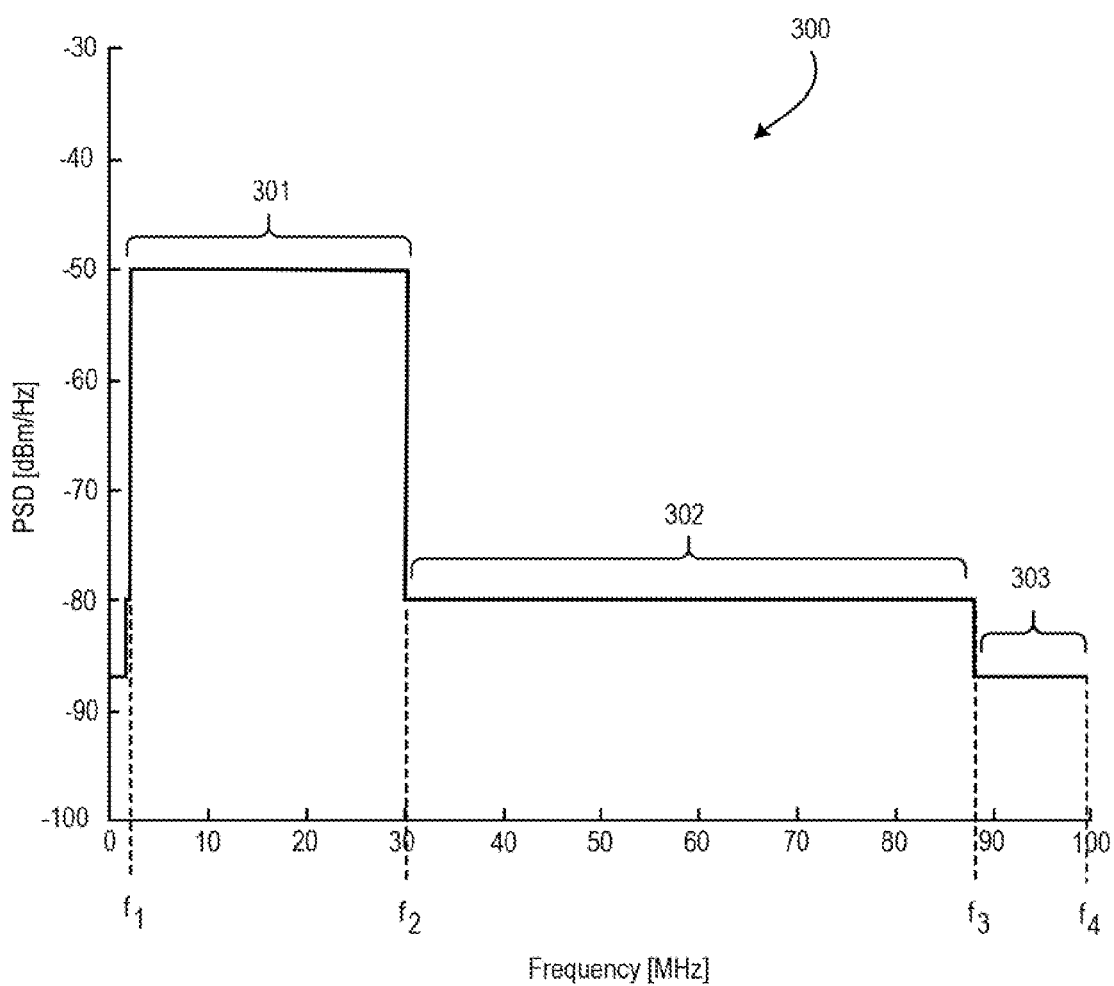
FIG. 3 is an illustration showing example power spectrum density constraints.

FIG. 3 shows an example power spectrum density (PSD) constraint 300. The PSD constraint 300 represents an exemplary distribution of maximum allowable transmission power for an example communications system. In the example, frequency bands include a first frequency sub-band 301 from $f_1$-$f_2$, a second frequency sub-band 302 from $f_2$-$f_3$, and a third frequency sub-band 303 from $f_3$-$f_4$. In the example of FIG. 3, each frequency sub-band is associated with a flat PSD. In other PSD constraints, the maximum power transmission may vary linearly with frequency. In general the PSD constraint can be different at different frequencies and together define a PSD constraint for a given frequency sub-band.

For some communications systems, regulatory authorities, such as the Federal Communications Commission (FCC) in the United States, stipulate emission limits (radiated, conducted or other) that in turn impose limits on power transmitted from a device. Typically, a manufacturer of communications equipment derives a maximum allowable PSD constraint from the regulatory limitations. The PSD constraint 300 is an example of a PSD mask with maximum allowable limits based, at least in part, on regulatory requirements. The PSD constraint 300 may represent a maximum allowable PSD for powerline communications systems, to meet the regulations for a certain frequency band (0-100 MHz, in this example) in North America. In this example, the transmission power limit is substantially equal to −50 dBm/Hz in the first frequency band 301, and substantially equal to −80 dBm/Hz in the second frequency band 302. Even though the example shows a frequency band 0-100 MHz, communications systems such as powerline communications systems can operate in other frequency bands including bands above 100 MHz.

In some implementations, transmitting at the maximum allowable power (or PSD Limit) for a given frequency results in the best throughput for that frequency. However, in some implementations, it may be desirable to reduce the PSD to a level less than the maximum allowable level for that frequency. For example, consider the difference in maximum transmission power associated with frequency sub-bands 301 and 302 of FIG. 3. If the same hardware, for example, a single digital-to-analog converter, is used in a transmitter to generate a wideband signal that spans the entire frequency range and uses the maximum allowable level in each band, then the signal in the second frequency sub-band 302 will be represented with fewer discrete levels than the signal in the first frequency sub-band 301. This, in turn will result in higher quantization noise and limited fidelity for the signal in the second frequency sub-band 302. In some cases, the quantization noise may be amplified when the signal, irrespective of the amplitude, is scaled at the input of the digital to analog converter to span the entire input range of the converter. The same principle also applies at the receiving converter that converts the analog received signal into digital levels. In some implementations, the errors arising due to increased quantization noise can be mitigated by reducing the power or PSD in the first frequency sub-band 301. Such reduction in the PSD of the first frequency sub-band 301 results in a lower difference with the PSD of the second frequency sub-band 302, thereby reducing the effect of the quantization noise. For example, if the PSD difference is reduced by 6 dB, the quantization noise in the second frequency sub-band 302 is halved. In other words, depending on the communications channel between two nodes of a network, a decrease from the maximum power in one frequency band can provide a gain to fidelity in the converters for another frequency band.

In some communications, the PSD constraints may include constraints based, at least in part, on coexistence of two or more communications technologies utilizing same or similar frequencies. Limiting transmission power for particular frequencies may enable two or more networks to utilize the same frequency allocations without causing unreasonable interference with one another. For example, a powerline network may utilize a frequency band ranging from 2-30 MHz. Meanwhile, another network or technology may use particular frequencies that overlap with the powerline frequency band. For example, in North America, there are currently approximately 10 particular frequency ranges (i.e., reserved frequency ranges) that share the 2-30 MHz band otherwise associated with powerline communications. Therefore, a powerline communications device is configured to reduce the transmit power spectral density (PSD) for the reserved sub-bands.

Another reason for reducing power of a particular frequency sub-band is to aid in the allocation of power more evenly across the frequencies supported by the communications channel. For example, a transmitter may have a total power capability that is supported by the transmitter. By reducing power for a particular frequency sub-band, portions of the total power may be redistributed or allocated to other frequencies. The allocation of portions of the total power may allow for more frequencies to be included in the transmission, or may provide higher power for frequencies that are associated with better channel conditions than other frequencies.

Figure 4A:
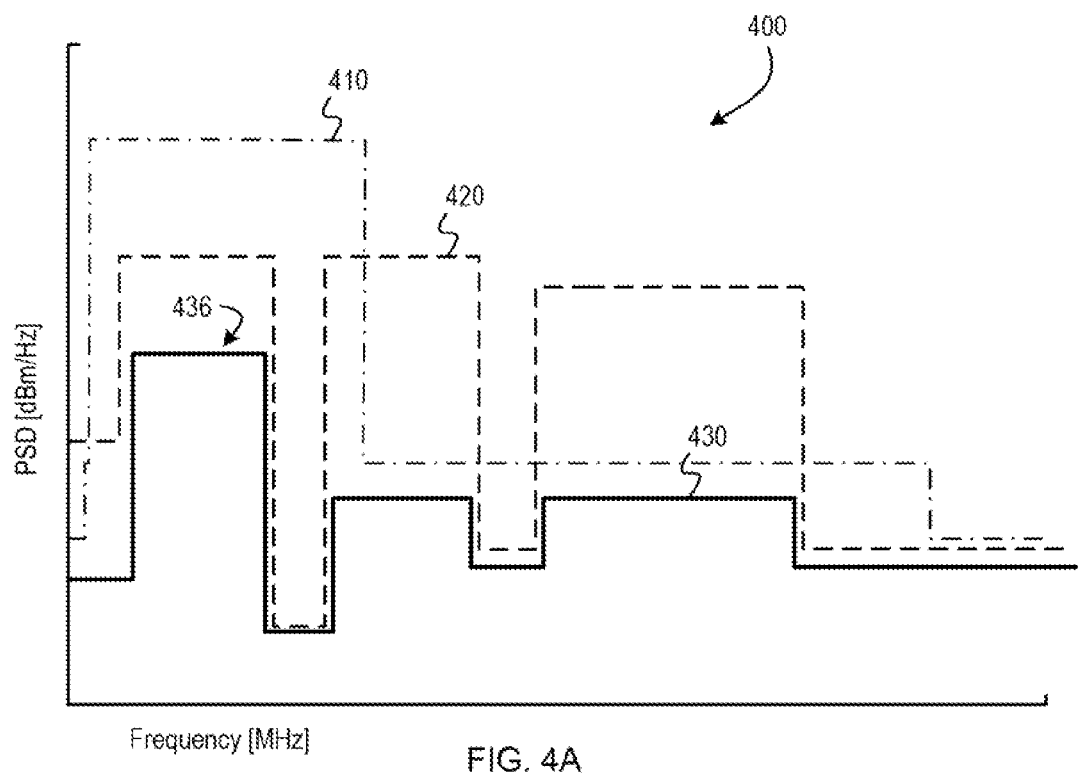
FIGS. 4A-4B are power spectrum density illustrations showing power allocation based, at least in part, on total power capability of a transmitter.
Figure 4B:
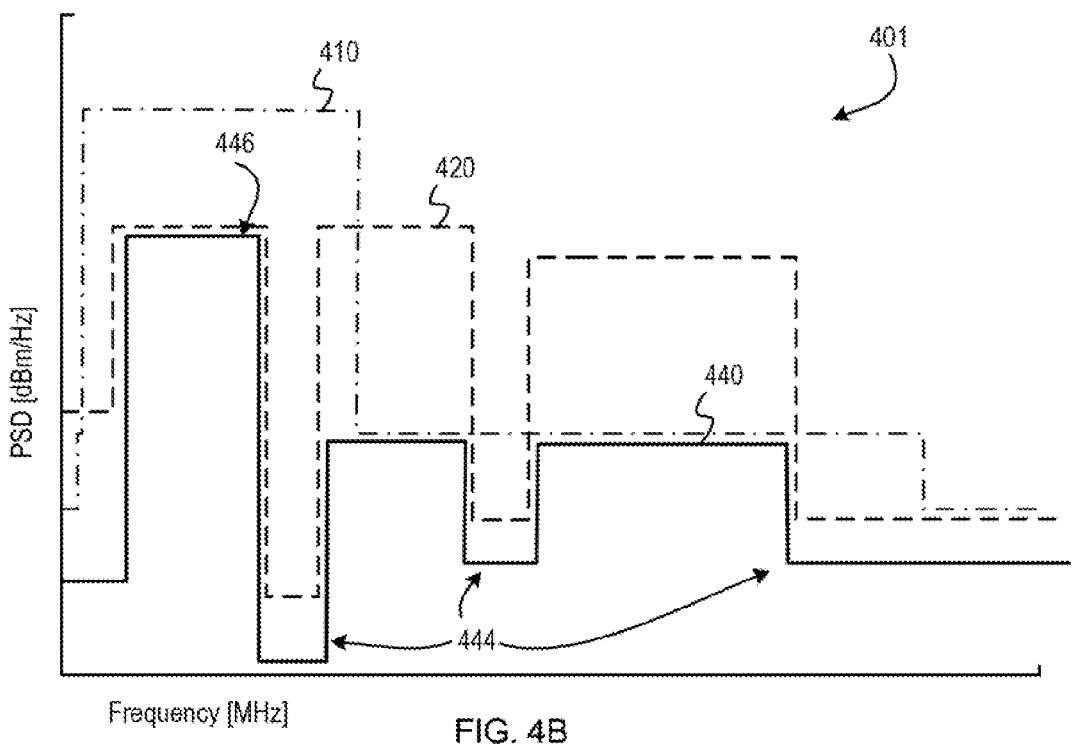

FIGS. 4A-4B illustrate example PSD constraints and associated target PSDs. In FIG. 4A, a PSD chart 400 is a conceptual illustration showing a first PSD constraint 410 and a second PSD constraint 420. For example, the first PSD constraint 410 may be associated with a regulatory constraint. The second PSD constraint 420 may be associated with channel conditions. It should be understood that while the first PSD constraint 410 and the second PSD constraint 420 are depicted as separate lines in the conceptual illustration, a transmission adaptation module may treat them as a combined PSD constraint. The transmitter may be configured to keep power of the various carriers below the lower of the first and second PSD constraints 410, 420.

In the PSD chart 400, a first target PSD 430 represents one example target PSD that a transmitter might use based, at least in part, on the first and second PSD constraints 410, 420. FIG. 4A illustrates an example in which the AFE module may have an associated total power capability. Shown at 436, the first target PSD 430 may utilize less power for a subset of frequencies due to power limitations of the AFE module. Alternatively, the transmission adaptation module may purposely lower the transmit power at 436 to decrease the notch depth between 436 and adjacent frequencies.

FIG. 4B shows another PSD chart 401 with similar first and second PSD constraints 410, 420. However, a second target PSD 440 shows another example target PSD that a transmitter might use. In the second target PSD 440, the transmission adaptation module may take into account the total power capability of the AFE module and re-allocate power to provide better throughput. For example, the transmission adaptation module may reduce power (shown at 444) of some notched frequencies that are deemed poor quality or unusable so that the power may be reallocated to better performing frequencies (shown at 446).

There may be many algorithms used by the transmission adaptation module 106 to determine an power allocation. Consider for example a transmitter that supports a total power output of 1 Watt and five frequency sub-bands. In this scenario, the frequency sub-bands may be of equal size. The transmission adaptation module 106 may optimize the allocation of power to each of the five frequency sub-bands (without exceeding other PSD constraints). For example, the transmission adaptation module 106 may utilize the channel quality characteristics associated with each of the individual frequency sub-bands. The transmission adaptation module may choose from the following power allocation schemes based, at least in part, on channel quality information associated with each of the frequency sub-bands:

allocate 0.2 W of power to each of the five frequency bands, allocate 0.25 W of power to four out of the five frequency bands, allocate 0.333 W of power to three out of the five frequency bands, some other division of power among the five frequency bands where the power in each frequency band may or may not be equal to the power allocated to another frequency band.

Each of the power allocation schemes may prove to be useful for particular communications channels. For example, if a communications channel is good across all frequencies, the transmission adaptation module may use the first power allocation scheme that allocates equal power (of 0.2 W) to each of the frequency bands. Power line channels often have frequency selective behavior where one or more frequency sub-bands may experience deep fades that make them impractical for data communication. Or channels could be subject to noise at the receiver where the noise could disproportionately affect one or more frequency sub-bands. In these cases, the transmission adaptation module may allocate more transmit power on those frequency sub-bands that do not experience fading and that do not experience strong noise, while allocating less (or no) power to the frequency sub-bands that experience fading or strong noise.

Figure 5:
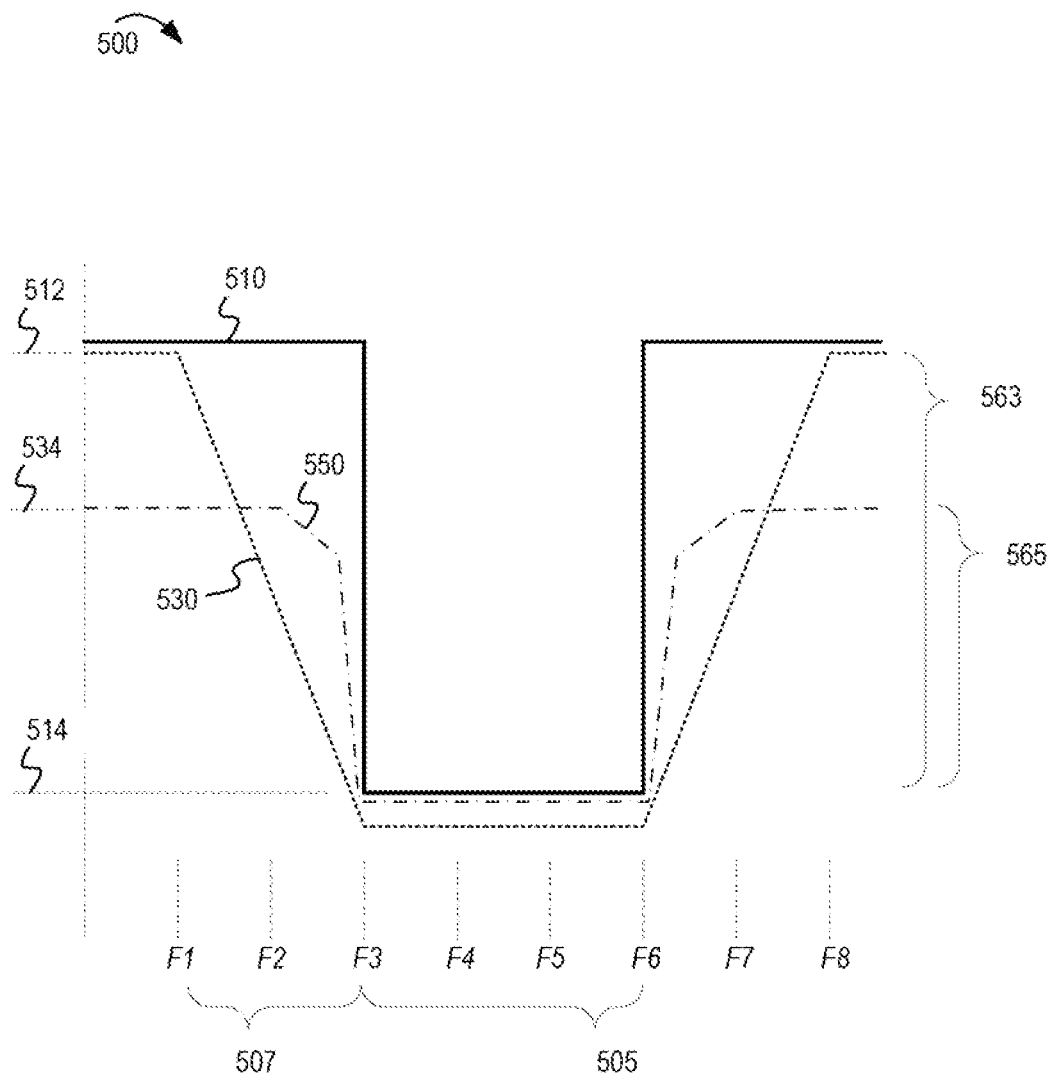
FIG. 5 is an illustration of a notch and two examples of potential PSDs of a signal based, at least in part, on various transmitter power settings.

FIG. 5 is a conceptual illustration 500 showing the relationship between a PSD of a signal and notch depth. In FIG. 5, a PSD constraint 510 has a notch 505. It should be understood that the illustration in FIG. 5 is greatly exaggerated and simplified so as to focus the attention of the reader to the relationship of the notch 505 to adjacent frequencies. The PSD constraint 510 is shown in which frequencies from F3-F6 are notched frequencies. In the example PSD constraint 510, the notched frequencies are limited to no greater power than the notched power level 514. At the frequencies that are not included in the notch, for example frequencies 507 (F1-F3) the PSD constraint allows for a maximum power level 512.

The PSD constraint 510 may be based, at least in part, on a regulatory requirement. Alternatively, the PSD constraint may include the notch as a result of SNR or other feedback related to the notched frequencies. For example, if the channel conditions for the notched frequencies are so poor that transmitted signals may not be reliable detected by the receiver, then the transmitter may create a frequency sub-band (for frequencies F3-F6) to impose a notch to prevent transmissions for poor performing frequencies (thus saving power to allocate to other frequencies). A transmitter may impose a notch in some embodiments in which a total power output of the transmitter is limited and the notch allows for power savings (from the notch) to be re-allocated to other frequency sub-bands.

FIG. 5 is used to illustrate the impact of notch depth to the selection of power levels and pulse shape. In some implementations, a greater notch depth may result in loss of usable carriers. In FIG. 5, a signal is shown using two different potential target PSDs (first PSD 530 and second PSD 550). The first PSD 530 illustrates the signal having a greater notch depth than the second PSD 550. The first PSD 530 shows the result of setting a power level for un-notched frequencies to the maximum power allowed by the PSD constraint 510. Because of the PSD-roll-off, the frequencies adjacent (e.g., frequencies 507) to the notched frequencies 505 will be set to lower power levels such that the no carriers of the signal exceeds the PSD constraint 510 at the notched frequencies 505. In the first PSD 530, the carriers from F1 to F3 may use less power and therefor represent less usable carriers for transmission of data.

The second PSD 550 has a smaller notch depth than the first PSD 530. The second PSD 550 is associated with setting the power level for un-notched frequencies to a reduced power level 534. As a result, the PSD roll-off is less and the transmitter may be possible to better utilize the adjacent carriers. For example, at frequency F2 the second PSD 550 may have a higher power than the first PSD 530. As described, a greater notch depth 563 (e.g., 39 dB) may be associated with fewer usable carriers than a smaller notch depth 565 (e.g., 30 dB). For this, and potentially other reasons, the transmission adaptation module may select a power level lower than a maximum allowable power level. The transmission adaptation module may also select a different transmission profile that provides for deeper notches. A transmission profile that provides for a deeper notch (such as in the first PSD 530) may not be optimal for the less deep notch in the second PSD 550.

Figure 6:
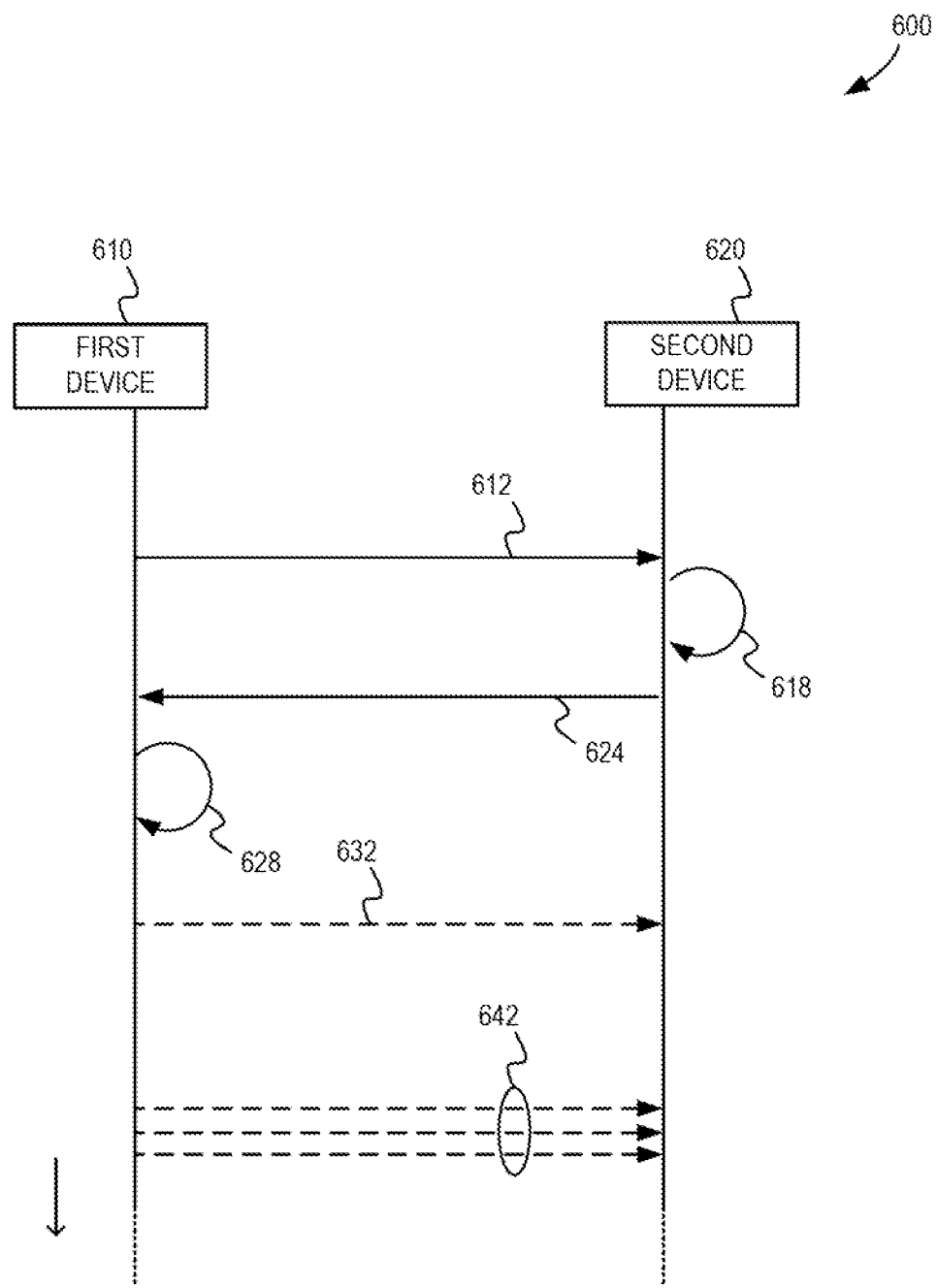
FIG. 6 is an illustration of an example message flow diagram in which concepts of this disclosure are described.

FIG. 6 is an illustration of an example message flow diagram 600 in which concepts of this disclosure are described. The example message flow diagram 600 depicts a first device 610 (e.g., transmitting device, similar to first device 110) and a second device 620 (e.g., receiving device, similar to second device 120). A communications medium (not shown) couples the two devices and provides a communications channel over which a multi-frequency signal may be communicated. At 612, the first device 610 may transmit reference signals (e.g., sounding reference signals) which may be detected by the second device 620.

At 618, the second device 620 may measure SNR or other characteristics associated with the reference signals. The second device 620 may also prepare a tone map or other information indicative of channel quality for particular frequencies. At 624, the second device 620 may communicate the tone map or other information indicative of channel quality back to the first device 610.

At 628, the first device 610 may utilize the tone map or other information indicative of channel quality to define a plurality of frequency sub-bands. For example, a set of consecutive frequencies that share the same tone map configuration and/or similar (within a threshold amount) quality may be grouped into a frequency sub-band. The frequency band associated with the communications channel may be sub-divided until all the frequencies have been assigned to one of a plurality of frequency sub-bands.

The first device 610 may then allocate portions of a total power capability associated with the transmitter to each of the plurality of frequency sub-bands. In some embodiments, the average quality associated with frequencies in a particular frequency sub-band may impact the allocation of power to the particular frequency sub-band. Next, the first device 610 may also determine a power level for each frequency sub-band based, at least in part, on the allocated portion of the maximum power allocated to the frequency sub-band. In some embodiments, the selection of a transmission profile or adjustments of power levels for particular frequencies may be made based, at least in part, on the resulting notch depth between two adjacent frequency sub-bands.

At 632, the first device 610 may optionally communicate an power allocation map or other message to the second device 620. At 642, the first device 610 may transmit signals using the allocated power and power level for each frequency used in the communications channel.

Figure 7:
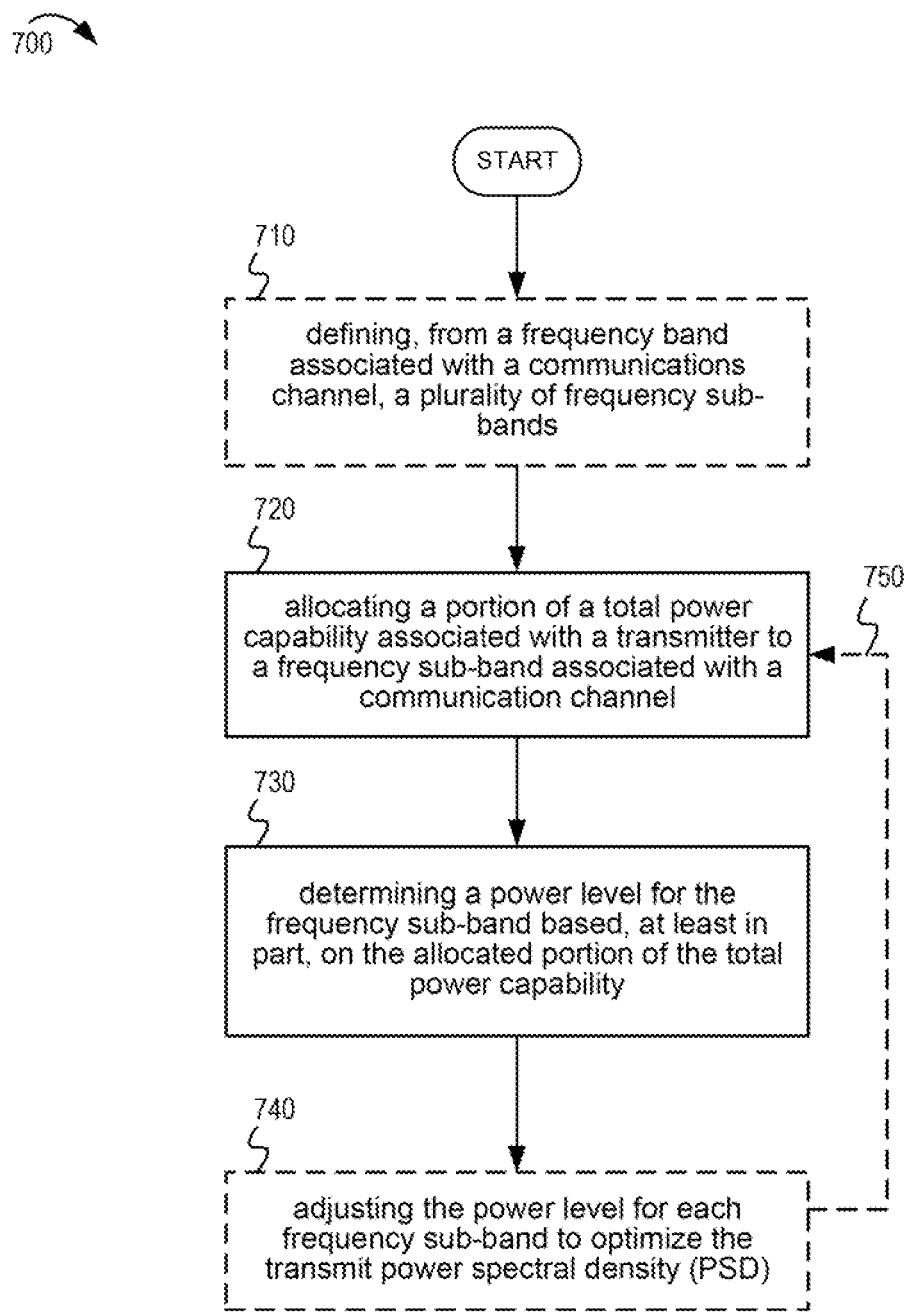
FIG. 7 is an example flowchart illustrating dynamic transmit power adaptation in accordance with an embodiment of the present disclosure.

FIG. 7 is an example flowchart 700 illustrating transmit power adaptation in accordance with an embodiment of the present disclosure. At 710, a communications device may optionally define, from a frequency band associated with a communications channel, a plurality of frequency subbands. At 720, the communications device may allocate a portion of a total power capability associated with a transmitter to a frequency sub-band associated with the communications channel. At 730, the communications device may determine a power level for the frequency sub-band based, at least in part, on the allocated portion of the total power capability. At 740, the communications device may optionally adjust the power level for each frequency sub-band to optimize the transmit power spectral density (PSD).

In one embodiment, the transmit adaptation may be iterative. For example, shown by arrow 750, after adjusting the power level for each frequency sub-band to optimize the transmit PSD, the flowchart may return to block 720. If less than the total power capability associated with the transmitter has been allocated, then at block 720, remaining portions of the total power capability may be allocated. Blocks 720, 730, 740 may be performed iteratively until the total power capability has been fully allocated and power levels for each frequency sub-band has been adjusted to optimize the transmit PSD.

Figure 8:
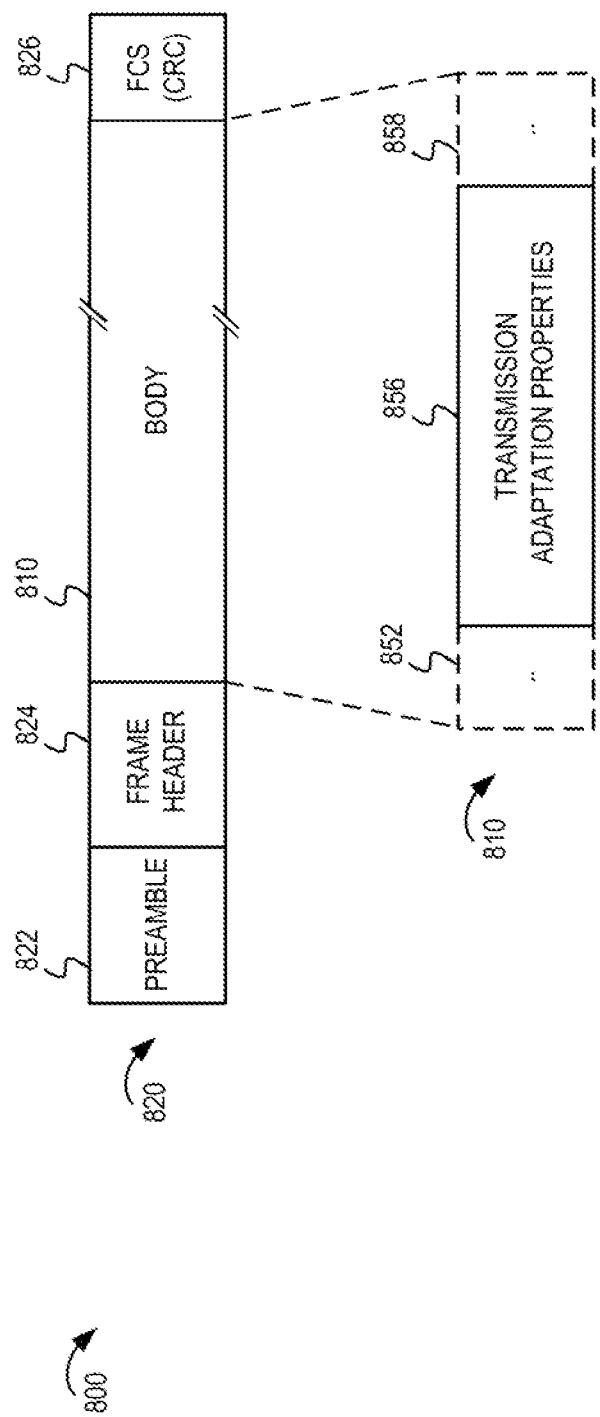
FIG. 8 depicts an example message format for communicating transmit power allocation and/or transmission profile information in accordance with an embodiment of the present disclosure.

FIG. 8 depicts an example message format 800 for communicating a transmission adaptation properties. In some embodiments, when a transmitter determines a particular transmit PSD, the transmitter may communicate the transmit PSD to the receiver. For example, the transmitter may encode the power level (or amplitude) used for each carrier, or for each group of carriers, and send the encoded message to the receiver. A message that conveys a transmitter-generated PSD may be referred to as a power allocation map. In some communications systems, a robust communications mode ("ROBO") may be used in which all carriers use same modulation and coding scheme (MCS). In a communications system that uses ROBO, the communication of a power allocation map may assist the receiver in properly receiving and decoding signals having different power levels for particular frequencies or frequency sub-bands.

The example message format 800 includes a transmission frame 820 having a preamble 822, a frame header 824, a frame body 810 and a frame check sequence (FCS) 826 (e.g., for sending a cyclic redundancy check, CRC, value). The frame body 810 may be encoded with one or more fields or information elements 852, 856, 858. For example, one or more information elements 856 may include the transmission adaptation properties encoded in a syntax known to both the transmitter and receiver.

In one embodiment, a transmission profile may be transmitted as an indicator in a frame header of a transmission frame. The frame header may not use the transmission profile, while the body of the transmission frame may use the transmission profile. In another embodiment, the transmission profile may be included as an indicator in a packet body of a transmission frame. The transmission profile may be used for a subsequent transmission frame.

Figure 9:
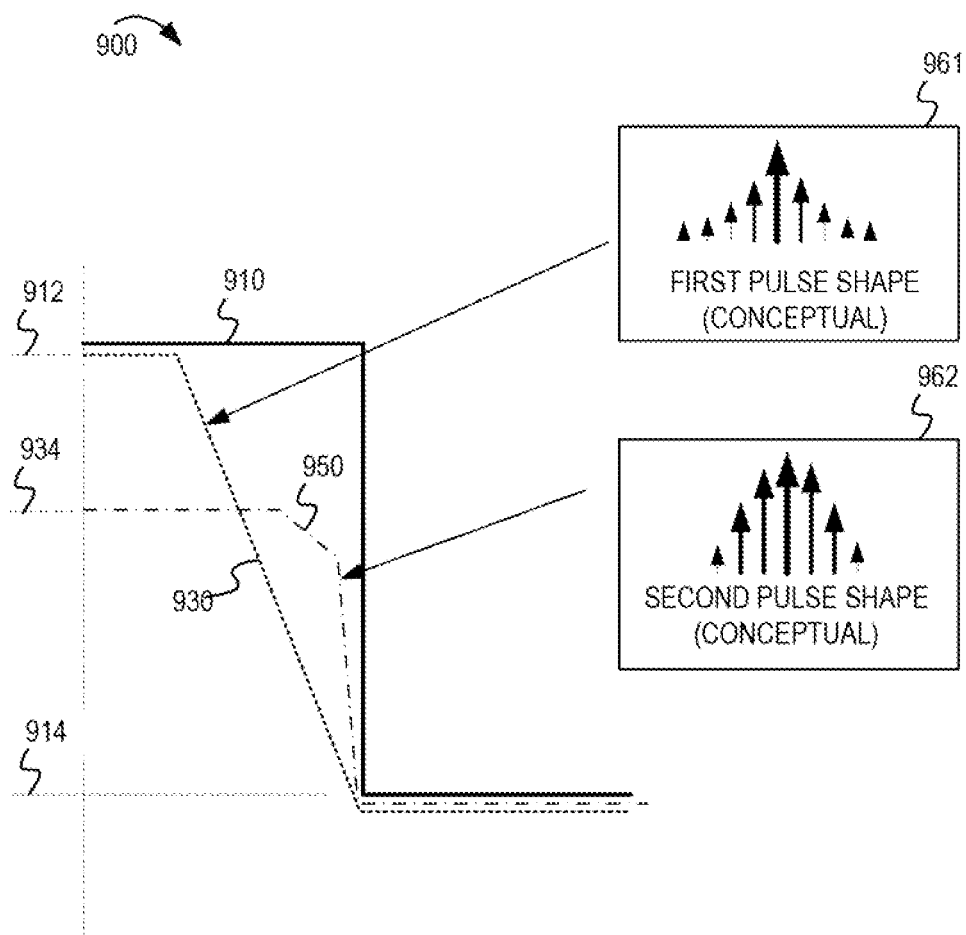
FIG. 9 depicts a selection of a transmission profile based, at least in part, on notch depth in accordance with an embodiment of the present disclosure.

FIG. 9 is a conceptual diagram 900 illustrating the selection of a transmission profile based, at least in part, on notch depth. A PSD constraint 910 may define the edge of a notch which has a maximum allowable power level 912 on one side of the edge and a notched power level 914 at the other side of the edge. A first PSD 930 may be associated with using the maximum allowable power level 912, and a second PSD 950 may be associated with using the reduced power level 934.

Also shown in FIG. 9 are two conceptual transmission profiles—a first transmission profile 961 and a second transmission profile 962. In accordance with various embodiments of this disclosure, a transmitter may maintain multiple transmission profiles. Each transmission profile may be customized (e.g., optimized) for PSDs based, at least in part, on the notch depths that are found in the PSD. For example, the first transmission profile 961 may be used when the transmitter uses power settings associated with the first PSD 930. The second transmission profile 962 may be used with the transmitter uses power settings associated with the second PSD 950. For example, if a notch depth is more than 30 dB, then a first transmission profile 961 may have characteristics that allow for steeper PSD roll-off. The second transmission profile 962 may be optimized for signals in which notch depths are 30 dB or less. In some embodiments, pulse shaping is done in time domain, which may affect all the carriers. In one embodiment, the selection of the transmission profile may be based, at least in part, on the average notch depth or mean notch depth from among all the notches in the target PSD for the transmission.

Pulse shaping may be used to create a controlled PSD roll-off for each carrier. As examples, first transmission profile may be used to create a roll-off where the power is distributed in a pattern of [0% 1% 4% 90% 4% 1% 0%] on the 7 carriers centered on the main carrier; and the second transmission profile may be used to create a roll-off where the power is distributed in a pattern of [1% 3% 6% 80% 6% 3% 1%] on the 7 carriers centered on the main carrier. The first transmission profile may achieve a steeper roll-off pattern, since more power is contained in the main carrier, and the adjacent carriers drop off quicker in terms of the power they include. In one embodiment, the pulse shaping may be performed by multiplying each time domain sample with a "pulse-shaping window" value. The window may be such that especially the beginning and the end of an OFDM symbol are shaped, and the majority of the OFDM symbol is unchanged in order to minimize distortion caused by pulse-shaping. In other embodiments, pulse-shaping can be performed by using a finite impulse response (FIR) filter in time domain, or it may be applied in the frequency domain (prior to the inverse FFT).

The different transmission profiles may utilize PSD roll-off characteristics that are optimized for particular notch depths. The transmission profile may also define different guard interval lengths associated with the timing between consecutive transmitted symbols. In some implementations, pulse-shaping (to accomplish a steeper roll-off pattern for larger notch depths) may be associated with a longer guard interval between symbols.

Figure 10A:
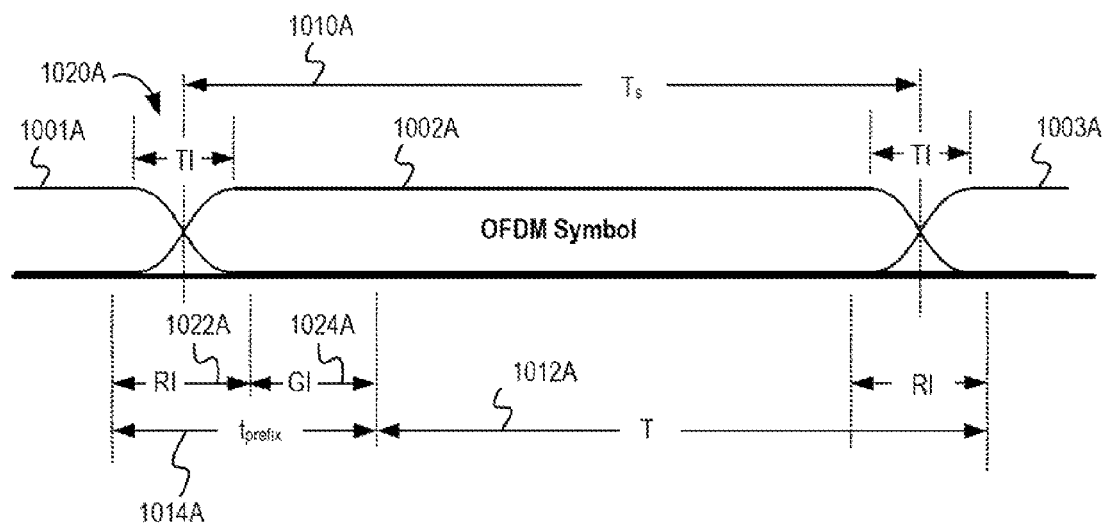
FIGS. 10A-10B are timing figures illustrating different orthogonal frequency division multiplexing (OFDM) symbol timing based, at least in part, on different transmission profiles in accordance with an embodiment of the present disclosure.
Figure 10B:
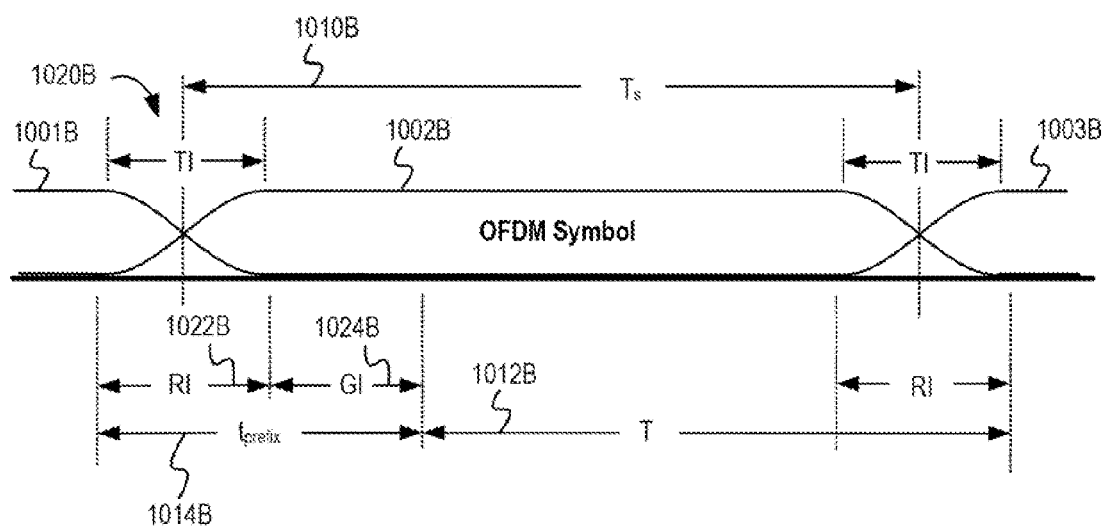

FIGS. 10A and 10B illustrate some concepts regarding symbol timing that may be used with transmission profile. In OFDM modulation, data is transmitted in the form of OFDM "symbols." Each symbol has a predetermined time duration or symbol time. Each symbol is generated from a superposition of a plurality of sinusoidal carrier waveforms that are orthogonal to each other and form the OFDM carriers. Each carrier has a peak frequency and a phase measured from the beginning of the symbol. Following the symbol, a guard interval time is used as a delay between subsequent symbols.

FIG. 10A illustrates a sequence of OFDM symbols 1001A, 1002A, and 1003A. A second OFDM symbol 1002A has a symbol period $T_S$ 1010A. Between a first OFDM symbol 1001A and the second OFDM symbol 1002A, there is a period of overlap where consecutive symbols both contribute to the power of a transmission. The overlap may also be referred to as a transition interval (TI) 1020A. The TI 1020A is closely related to the roll-off interval (RI) 1022A that is configured for the transition. Following the RI 1022A is a guard interval (GI) 1024A. Together the RI 1022A and GI 1024A are used to transmit a cyclic prefix 1014A of the OFDM symbol. Next an IFFT interval T 1012A defines the time during which the OFDM symbol includes samples from the IFFT process. The RI 1022A may be 4.96 microseconds in some communications systems, and the TI 1020A is less than or equal to 4.96 microseconds.

FIG. 10B illustrates a sequence of OFDM symbols 1001B, 1002B, and 1003B. A second OFDM symbol 1002B has a symbol period $T_S$ 1010B. The symbol period $T_S$ 1010B may be the same as symbol period $T_S$ 1010A. Between a first OFDM symbol 1001B and the second OFDM symbol 1002B, there is a transition interval (TI) 1020B, related to a roll-off interval (RI) 1022B that is configured for the transition. Following the RI 1022B is a guard interval (GI) 1024B. Together the RI 1022B and GI 1024B are used to transmit a cyclic prefix 1014B of the OFDM symbol. Next an IFFT interval T 1012B defines the time during which the OFDM symbol includes samples from the IFFT process.

In accordance with at least one embodiment of this disclosure, a transmission profile may be associated with symbol timing information. The symbol timing information may define characteristics, such as TI (or RI) and GI associated with the OFDM symbol. For example, some pulse shaping may benefit from a longer transition interval so that power may be spread out further to support a pulse shaping for deeper notches. As an example, the TI 1020A of FIG. 10A may be 4.96 microseconds while the TI 1020B of FIG. 10B may be 6.00 microseconds. By adjusting the symbol timing, different pulse shapes may be used that have a longer or shorter overlap (e.g., TI or RI) with the subsequent OFDM symbol. As another example, the GI 1022A of FIG. 10A may be 5.56 microseconds while the GI 1022B of FIG. 10B may be 7.56 microseconds.

The pulse shaping has an effect on the PSD roll-off as described previously. A longer taper in time domain may enables a sharper roll-off in frequency domain. So, to achieve a deeper notch, a sharper frequency domain roll-off may be desired. Therefore, to obtain a sharper frequency domain roll-off, it is advantageous to use a longer tapering period. The tapering period may be increased by using a longer transition interval and/or guard interval.

In one embodiment, a longer overlap (e.g., TI) and/or longer guard interval may be associated with a transmission profile used for deep notches. A shorter overlap and/or shorter guard interval may be used for lower transmitted power. A transmission adaptation module may determine the power levels and notch depths for a transmission and then select the transmission profile that is optimal for the notch depth. The symbol timing parameters, such as overlap, guard interval, etc., may be part of the transmission profile.

In other embodiments, the transmission profile may be based, at least in part, on the channel conditions. Poor channel conditions may benefit from a longer overlap. In a system in which power may be increased for poor channels, having a longer overlap and pulse shaping with steeper PSD roll-off may improve the reception and sampling of the OFDM symbol by the receiver. In another example, where channel conditions are good, a transmitter may reduce power of the transmission and use a shorter overlap (and shorter guard interval) to maximize the PHY transmission rate. In another example, when the channel conditions are poor (e.g., low SNR), the transmitter may increase power up to the maximum power (e.g., up to PSD constraint).

To aid a receiver in symbol processing, a transmitter may communicate information about the transmission profile, including symbol timing parameters, to the receiver.

Figure 11:
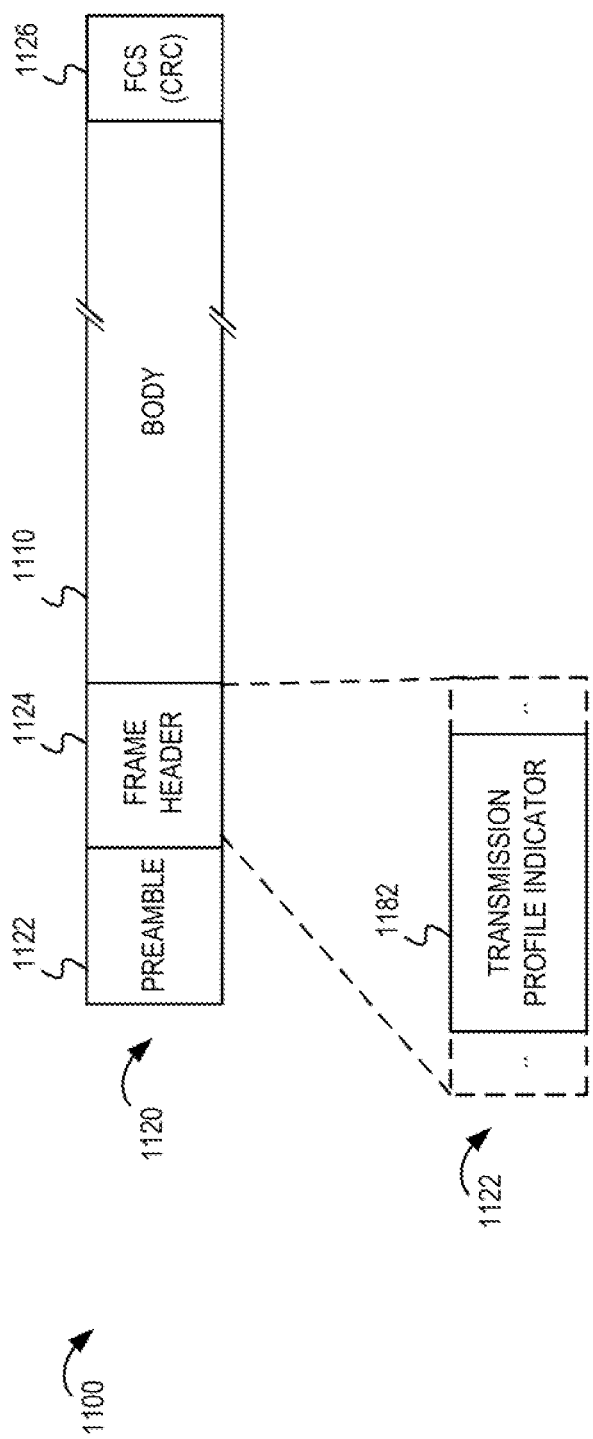
FIG. 11 depicts an example message format for communicating a selected transmission profile in accordance with an embodiment of the present disclosure.

FIG. 11 depicts an example message format 1100 for communicating a selected transmission profile in accordance with an embodiment of the present disclosure. A transmission profile indicator 1182 may be included in a frame header 1124 of a transmission frame 1120. The transmission frame 1120 may also include a preamble 1122, a frame body 1110, and a FCS 1126. In alternative implementations, the transmission profile indicator 1182 may be included as part of the frame body 1110. A transmission frame may be transmitted as a series of OFDM symbols. By signaling information about the transmission profile in the preamble, a receiver may utilize the transmission profile information in the reception of subsequent OFDM symbols for the transmission frame 1120 or subsequent transmissions.

In some embodiments, the transmission profile indicator 1182 may be an indicator which identifies one of a plurality of predefined or pre-communicated transmission profiles known to both the transmitter and the receiver. The transmitter may include the transmission profile indicator 1182 to identify the transmission profile that is used for signaling of a remaining portion of the transmission frame 1120 or subsequent transmission frames (not shown). For example, a transmission profile indicator 1182 included in the frame headers 1124 may indicate that the transmission profile will be used for the transmission of symbols that make up the frame body 1110.

Figure 12:
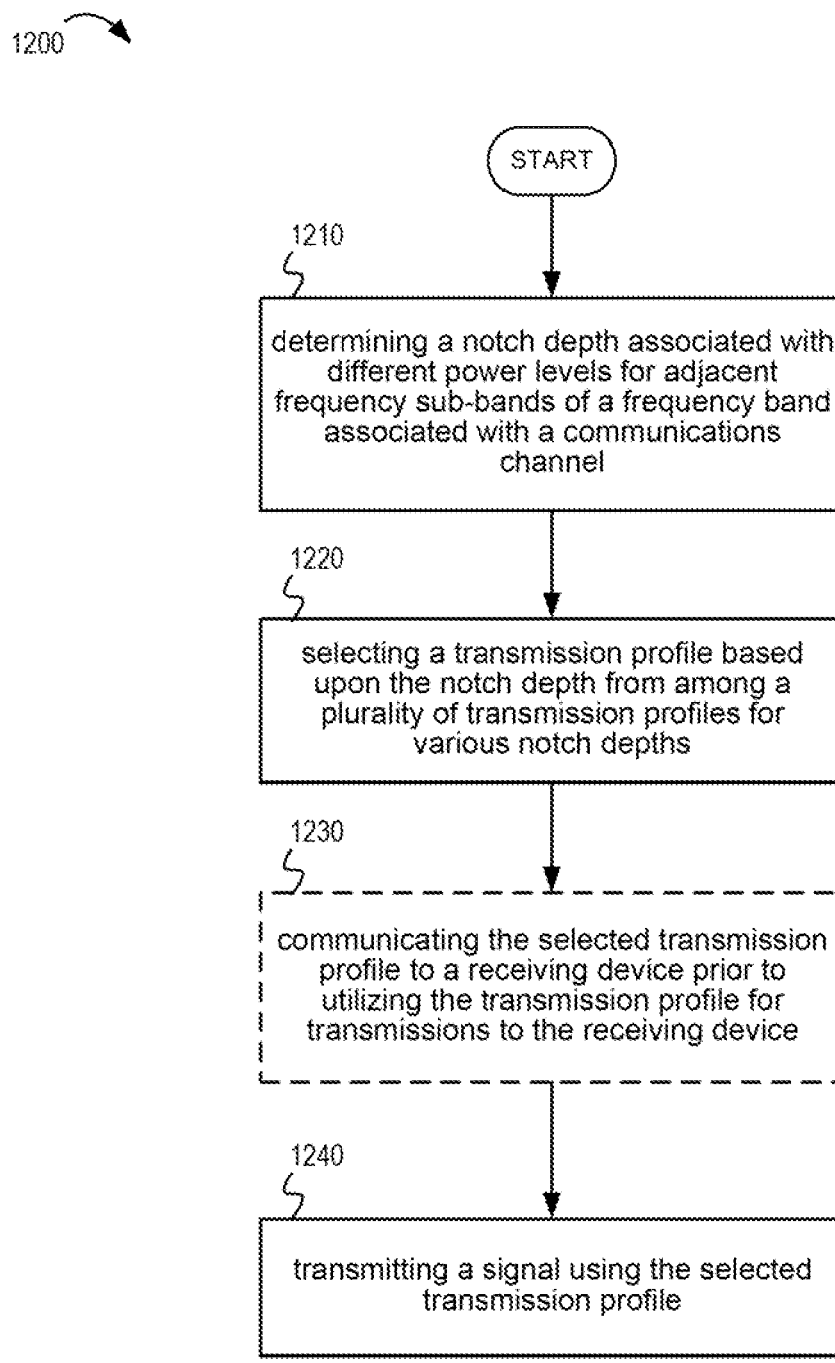
FIG. 12 is an example flowchart illustrating communicating a selected transmission profile in accordance with an embodiment of the present disclosure.

FIG. 12 is an example flowchart 1200 illustrating a method in accordance with an embodiment of the present disclosure. At 1210, the method may include determining a notch depth associated with different power levels for adjacent frequency sub-bands of a frequency band associated with a communications channel. At 1220, the method may include selecting a transmission profile based, at least in part, on the notch depth from among a plurality of transmission profiles for various notch depths. At 1230, the method may optionally include communicating the selected transmission profile to a receiving device prior to utilizing the transmission profile for transmissions to the receiving device. At 1240, the method may include transmitting a signal using the selected transmission profile.

Figure 13:
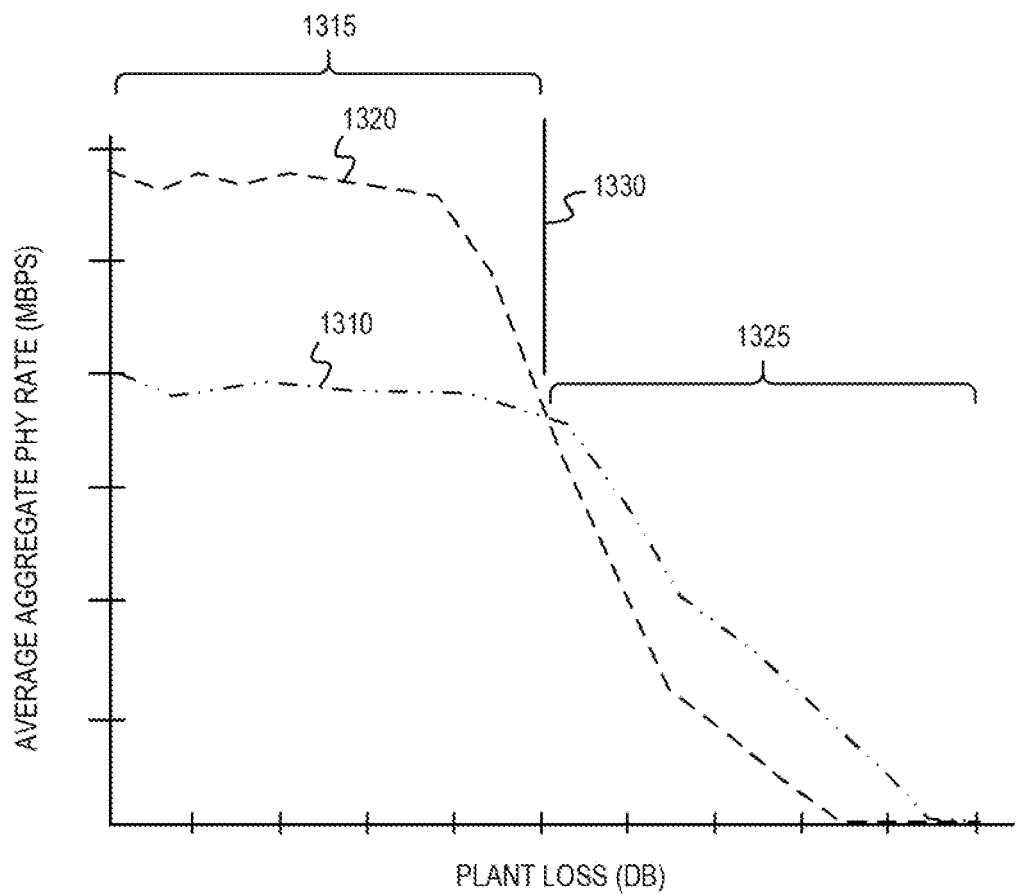
FIG. 13 is an example illustration showing effectiveness of different transmission profiles.

FIG. 13 is an example illustration showing effectiveness of different transmission profiles based, at least in part, on cable plant loss (e.g., attenuation of signal caused by channel conditions of the communications medium). A first and second plots 1310, 1320 shows the average aggregate PHY rate of a first transmission profile for different plant loss. The first plot 1310 is associated with first transmission profile that uses a transition interval of 4.96 microseconds with a guard interval of 5.56 microseconds. The first transmission profile is used with −50 dBm/Hz power in the lower frequency band and −80 dBm/Hz power in the upper frequency band and Ham bands. The second plot 1320 is associated with a second transmission profile that uses a transition interval of 1.24 microseconds with guard interval of 2.56 microseconds. The second transmission profile is used with −62 dBm/Hz power in the lower band and −80 dBm/Hz power in the upper band and Ham bands. Based, at least in part, on the illustration, the second transmission profile (second plot 1320) gets better PHY rates at low attenuations 1315. The first transmission profile (first plot 1310) gets better PHY rates at high attenuations 1325.

In some embodiments, a transmission adaptation module may identify a threshold 1330 based, at least in part, on channel conditions or power level to determine which of a plurality of transmission profiles to use for a transmission.

It should be understood that FIGS. 1-13 and the operations described herein are examples meant to aid in understanding embodiments and should not be used to limit embodiments or limit scope of the claims. Embodiments may perform additional operations, fewer operations, operations in parallel or in a different order, and some operations differently.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 14:
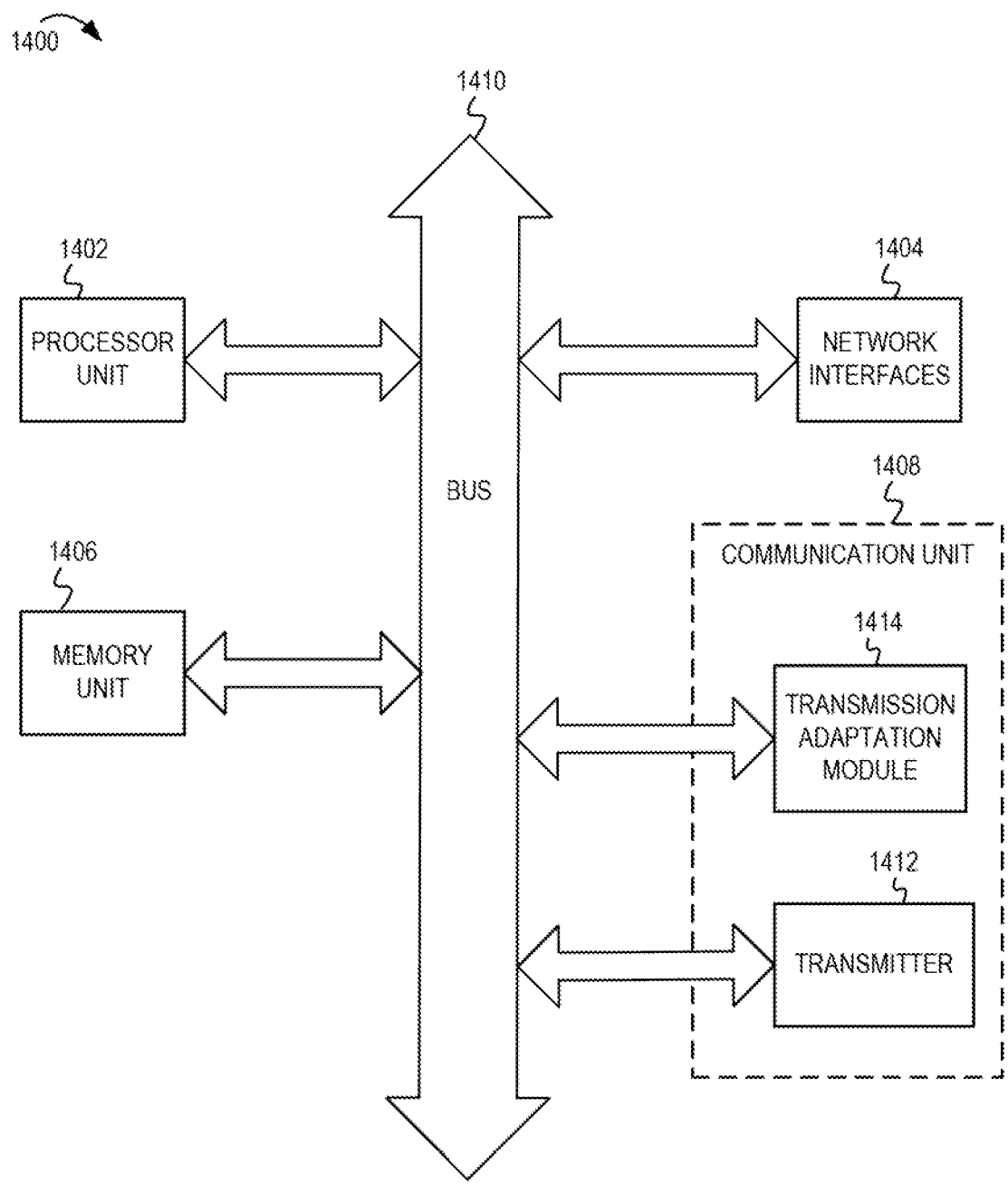
FIG. 14 is an example block diagram of one embodiment of an electronic device suitable for implementing various embodiments of the present disclosure.

FIG. 14 is an example block diagram of one embodiment of an electronic device 1400 suitable for transmit power adaptation in accordance with various embodiments of this disclosure. In some implementations, the electronic device 1400 may be one of a laptop computer, a netbook, a mobile phone, a powerline communications device, a personal digital assistant (PDA), or other electronic systems. The electronic device 1400 includes a processor unit 1402 (possibly including multiple processors, multiple cores, multiple nodes, and/or implementing multi-threading, etc.). The electronic device 1400 includes a memory unit 1406. The memory unit 1406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1400 also includes a bus 1410 (e.g., PCI, ISA, PCI-Express, HyperTransport®, InfiniBand®, NuBus, AHB, AXI, etc.), and network interfaces 1404 that include at least one of a wireless network interface (e.g., a WLAN interface, a Bluetooth® interface, a WiMAX interface, a ZigBee® interface, a Wireless USB interface, etc.) and a wired network interface (e.g., an Ethernet interface, a powerline communications interface, etc.). In some implementations, the electronic device 1400 may support multiple network interfaces—each of which is configured to couple the electronic device 1400 to a different communications network.

The electronic device 1400 also includes a transmission adaptation module 1414 and a transmitter 1412. In some embodiments, the transmission adaptation module 1414 and the transmitter 1412 may be included as part of a communications unit 1408. it should be understood, that in some embodiments, the communications unit 1408 may also have a dedicated processor (e.g., such as a communications unit comprising a system on a chip, or board with multiple chips, or multiple boards, in which the communication may have one or more dedicated processor or processing unit(s), in addition to the main processor 1402).

As described above in FIGS. 1-13, the transmission adaptation module 1414 may implement functionality related to transmission adaptation. For example, the transmission adaptation module 1414 may be suitable to allocate portions of power from a total power capability of the transmitter 1412 to one or more frequency sub-bands based, at least in part, on a variety of factors as described herein. The transmission adaptation module 1414 may also alter power levels for particular frequencies based, at least in part, on notches in a PSD constraint. The transmission adaptation module 1414 may also select one of a plurality of transmission profiles that are optimized for a particular notch depth. The transmission adaptation module 1414 may utilize symbol timing information associated with the transmission profile to configure symbol timing parameters.

Any one of these functionalities may be partially (or entirely) implemented in hardware and/or on the processor unit 1402. For example, the functionality may be implemented with an application specific integrated circuit, in logic implemented in the processor unit 1402, in a co-processor on a peripheral device or card, etc. Further, realizations may include fewer or additional components not illustrated in FIG. 14 (e.g., video cards, audio cards, additional network interfaces, peripheral devices, etc.). The processor unit 1402, the memory unit 1406, and the network interfaces 1404 are coupled to the bus 1410. Although illustrated as being coupled to the bus 1410, the memory unit 1406 may be coupled to the processor unit 1402.

While the embodiments are described with reference to various implementations and exploitations, it will be understood that these embodiments are illustrative and that the scope of the present disclosure is not limited to them. In general, techniques for transmission adaptation as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method performed by an apparatus for communicating a signal via a network, the method comprising:
   grouping a first set of contiguous frequencies to define a first frequency sub-band within a frequency band associated with a communications channel, wherein the first frequency sub-band is associated with notched frequencies;
   allocating a first amount of power to the first frequency sub-band, the first amount of power based, at least in part, on a total power capability associated with a transmitter of the apparatus;
   determining a first power level for the first frequency sub-band based, at least in part, on the allocated first amount of power;
   determining a notch depth for the first frequency sub-band, the notch depth being a difference between the first power level for the first frequency sub-band and a second power level for a second frequency sub-band adjacent to the first frequency sub-band;
   selecting a first transmission profile based, at least in part, on the notch depth, the first transmission profile selected from among a plurality of transmission profiles for various notch depths, wherein the first transmission profile is optimized for the notch depth; and
   transmitting the signal using the first transmission profile and the first power level for the first frequency sub-band.

2. The method of claim 1, further comprising:
   defining a plurality of frequency sub-bands within the frequency band associated with the communications channel; and
   allocating corresponding amounts of power to each of the plurality of frequency sub-bands.

3. The method of claim 2, further comprising:
   determining power levels for each of the plurality of frequency sub-bands based, at least in part, on the corresponding amounts of power allocated to each of the plurality of frequency sub-bands.

4. The method of claim 1, further comprising:
   encoding the first power level as part of a message; and
   communicating the message to a receiving device.

5. The method of claim 1, further comprising:
   dynamically grouping, based at least in part on channel quality indicators, a second set of contiguous frequencies to define the second frequency sub-band within the frequency band associated with the communications channel;
   allocating a second amount of power to the second frequency sub-band, the second amount of power based, at least in part, on a remaining amount of the total power capability after allocating the first amount of power; and
   determining the second power level for the second frequency sub-band based, at least in part, on the second amount of power allocated to the second frequency sub-band.

6. The method of claim 1, wherein determining the first power level comprises:
   decreasing the first power level to a notched power level for the first frequency sub-band; and
   reducing the first amount of power allocated to the first frequency sub-band based, at least in part, on the notched power level.

7. The method of claim 6, further comprising:
   determining a remaining amount of the total power capability after said reducing the first amount of power; and
   allocating at least a portion of the remaining amount of the total power capability to at least one remaining frequency sub-band.

8. The method of claim 1, wherein transmitting the signal comprises:
   performing pulse shaping in a time domain in accordance with the first transmission profile.

9. The method of claim 1, wherein the first transmission profile is associated with pulse shaping or symbol timing or a combination thereof.

10. The method of claim 1, further comprising:
    communicating the first transmission profile to a receiving device prior to utilizing the first transmission profile for transmissions to the receiving device.

11. The method of claim 10, wherein said communicating the first transmission profile includes transmitting an indicator in a frame header of a transmission frame, wherein the frame header does not use the first transmission profile and body of the transmission frame does use the first transmission profile.

12. The method of claim 10, wherein said communicating the first transmission profile includes transmitting an indicator in a packet body of a transmission frame, wherein the first transmission profile is used for a subsequent transmission frame.

13. An apparatus to transmit a signal via a network, the apparatus comprising:
   a processor;
   a memory for storing instructions which, when executed by the processor, cause the apparatus to:
      group a first set of contiguous frequencies to define a first frequency sub-band within a frequency band associated with a communications channel, wherein the first frequency sub-band is associated with notched frequencies,
      allocate a first amount of power to the first frequency sub-band, the first amount of power based, at least in part, on a total power capability associated with a transmitter,
      determine a first power level for the first frequency sub-band based, at least in part, on the allocated first amount of power,
      determine a notch depth for the first frequency sub-band, the notch depth being a difference between the first power level for the first frequency sub-band and a second power level for a second frequency sub-band adjacent to the first frequency sub-band, and
      select a first transmission profile based, at least in part, on the notch depth, the first transmission profile selected from among a plurality of transmission profiles for various notch depths, wherein the first transmission profile is optimized for the notch depth; and
   the transmitter configured to transmit the signal using the first transmission profile and the first power level for the first frequency sub-band.

14. The apparatus of claim 13, wherein the instructions, when executed by the processor, cause the apparatus to:
   define a plurality of frequency sub-bands within the frequency band associated with the communications channel, and
   allocate corresponding amounts of power to each of the plurality of frequency sub-bands.

15. The apparatus of claim 13, wherein the instructions, when executed by the processor, cause the apparatus to:
   decrease the first power level to a notched power level for the first frequency sub-band,
   reduce the first amount of power allocated to the first frequency sub-band based, at least in part, on the notched power level,
   determine a remaining amount of the total power capability after reduction of the first amount of power, and
   allocate at least a portion of the remaining amount of the total power capability to at least one remaining frequency sub-band.

16. The apparatus of claim 13, wherein the instructions, when executed by the processor, cause the apparatus to:
   encode the first power level as part of a message; and
   communicate the message to a receiving device.

17. The apparatus of claim 13,
   wherein the first transmission profile is associated with pulse shaping or symbol timing or a combination thereof.

18. The apparatus of claim 13, wherein the instructions, when executed by the processor, cause the apparatus to perform pulse shaping in a time domain in accordance with the first transmission profile.

19. The apparatus of claim 13, wherein the instructions, when executed by the processor, cause the apparatus to communicate the first transmission profile to a receiving device prior to utilizing the first transmission profile for transmissions to the receiving device.

20. The apparatus of claim 19, wherein the instructions, when executed by the processor, cause the apparatus to communicate the first transmission profile to the receiving device by transmitting an indicator in a frame header of a transmission frame, wherein the frame header does not use the first transmission profile and a body of the transmission frame does use the first transmission profile.

21. A non-transitory computer readable medium for storing instructions which, when executed by a processor of an apparatus, cause the apparatus to:
   group a first set of contiguous frequencies to define a first frequency sub-band within a frequency band associated with a communications channel, wherein the first frequency sub-band is associated with notched frequencies,
   allocate a first amount of power to the first frequency sub-band, the first amount of power based, at least in part, on a total power capability associated with a transmitter,
   determine a first power level for the first frequency sub-band based, at least in part, on the allocated first amount of power,
   determine a notch depth for the first frequency sub-band, the notch depth being a difference between the first power level for the first frequency sub-band and a second power level for a second frequency sub-band adjacent to the first frequency sub-band,
   select a first transmission profile based, at least in part, on the notch depth, the first transmission profile selected from among a plurality of transmission profiles for various notch depths, wherein the first transmission profile is optimized for the notch depth, and
   transmit the signal using the first transmission profile and the first power level for the first frequency sub-band.

22. The non-transitory computer readable medium of claim 21, wherein the instructions, when executed by the processor, cause the apparatus to:
   define a plurality of frequency sub-bands within the frequency band associated with the communications channel, and
   allocate corresponding amounts of power to each of the plurality of frequency sub-bands.

23. The non-transitory computer readable medium of claim 21, wherein the first frequency sub-band is associated with notched frequencies or the channel quality indicators are below a quality threshold, and wherein the instructions, when executed by the processor, cause the apparatus to:
   determine a notched power level for the first frequency sub-band,
   reduce the first amount of power allocated to the first frequency sub-band based, at least in part, on the notched power level,
   determine a remaining amount of the total power capability after reduction of the first amount of power, and
   allocate at least a portion of the remaining amount of the total power capability to at least one remaining frequency sub-band.

24. The non-transitory computer readable medium of claim 21, wherein the instructions, when executed by the processor, cause the apparatus to:
   encode the first power level as part of a message; and
   communicate the message to a receiving device.

25. The non-transitory computer readable medium of claim 21, wherein the first transmission profile is associated with pulse shaping or symbol timing or a combination thereof.

26. The non-transitory computer readable medium of claim 21, wherein the instructions, when executed by the processor, cause the apparatus to perform pulse shaping in a time domain in accordance with the first transmission profile.

27. The non-transitory computer readable medium of claim 21, wherein the instructions, when executed by the processor, cause the apparatus to communicate the first transmission profile to a receiving device prior to utilizing the first transmission profile for transmissions to the receiving device.

28. The non-transitory computer readable medium of claim 27, wherein the instructions, when executed by the processor, cause the apparatus to communicate the first transmission profile to the receiving device by transmitting an indicator in a frame header of a transmission frame, wherein the frame header does not use the first transmission profile and a body of the transmission frame does use the first transmission profile.

\* \* \* \* \*